United States Patent
Waki et al.

(10) Patent No.: US 6,771,307 B2
(45) Date of Patent: Aug. 3, 2004

(54) IMAGE CALIBRATION DEVICE AND IMAGE CALIBRATION METHOD

(75) Inventors: Mitsuji Waki, Hachioji (JP); Tadashi Nishio, Iruma (JP); Akihiro Kubota, Kokubunji (JP); Masaki Higurashi, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 520 days.

(21) Appl. No.: 09/797,103

(22) Filed: Mar. 1, 2001

(65) Prior Publication Data

US 2001/0019358 A1 Sep. 6, 2001

(30) Foreign Application Priority Data

Mar. 6, 2000 (JP) ........................................ 2000-060868

(51) Int. Cl.[7] .......................... H04N 17/00; H04N 3/22
(52) U.S. Cl. ........................ 348/189; 348/191; 348/745
(58) Field of Search .............................. 348/745, 744, 348/806, 807, 191, 658, 602, 603, 177, 178, 180, 189; H04B 17/00, 3/22

(56) References Cited

U.S. PATENT DOCUMENTS

| | | | |
|---|---|---|---|
| 4,935,818 A | | 6/1990 | Wang |
| 5,069,529 A | * | 12/1991 | Takahashi .................. 359/601 |
| 5,325,276 A | * | 6/1994 | Sullivan ..................... 362/84 |
| 6,219,011 B1 | * | 4/2001 | Aloni et al. ................ 345/1.3 |
| 6,222,593 B1 | * | 4/2001 | Higurashi et al. .......... 348/745 |

FOREIGN PATENT DOCUMENTS

| | | |
|---|---|---|
| EP | 1 039 749 A1 | 9/2000 |
| JP | 9-326981 | 12/1997 |
| WO | WO 99/14716 A | 3/1999 |

* cited by examiner

Primary Examiner—Michael H. Lee
(74) Attorney, Agent, or Firm—Frishauf, Holtz, Goodman & Chick, P.C.

(57) ABSTRACT

In an image calibration device 10, a calibration pattern is projected onto a screen 4 from each projector 3 under control of a personal computer or other calibration device 10a, pictures are taken by a digital camera or other image pick-up device 11, and the results are supplied to the calibration device 10a. The calibration device 10a uses the supplied picture data to calculate parameters in order to perform picture positioning, color adjustment, brightness adjustment and other adjustments and corrections, and based on the calculation results transforms the original picture data, generates and supplies signals indicating projection conditions to each of the projectors 3, and performs image calibration control of the pictures projected by each projector 3. Here at the time of taking pictures, by installing on the image pick-up device 11 a shielding member 12 formed into a tetragonal pyramid shape, the light-receiving part of the image pick-up device 11 and the screen are completely shielded from ambient external light. By this means, the measurement precision of the image pick-up device 11 is improved, and accurate and reliable image calibration is performed.

14 Claims, 18 Drawing Sheets

IMAGE CALIBRATION DEVICE AND IMAGE CALIBRATION METHOD

This application claims the benefit of Japanese Application No. 2000-60868 filed in Japan on Mar. 6, 2000, the entire disclosure of which is incorporated by reference.

BACKGROUND OF THE INVENTION

1. Field of the Invention

This invention concerns an image calibration device and image calibration method for a multi-display device which combines and displays on a screen the projected pictures of a plurality of projectors, and in particular concerns an image calibration device and image calibration method capable of accurate image calibration of the projected picture of a multi-display device.

2. Description of the Related Art

In recent years, with the growing screen sizes of display devices, there has been interest in projectors which display pictures on screens by enlargement and projection.

Such projectors include, for example, liquid crystal projectors in which a picture is displayed on a liquid crystal panel based on input image signals, and by enlargement and projection, this picture is displayed on a screen. Due to the thin shape, light weight, low driving voltage, and low power consumption of the display device, liquid crystal projectors are currently the mainstream of such display devices.

Due to recent demands for increased screen sizes, so-called multi-display devices, which enable the display of large-screen pictures by combining a plurality of the above projectors, have come into use as, for example, displays for corporate advertising and various events.

In general, multi-display devices are either devices comprising a plurality of projectors accommodated by a housing and a single screen, or so-called cube-type devices in which a projector and screen set make up a single device, a plurality of which are combined in, for example, a 2×2 configuration, positioning four such sets as a single display device. Other devices are front-projection-type devices in which a plurality of projectors are provided in a row, for enlargement and projection onto a single screen.

However, in the above-described multi-display device, because a picture is displayed on a large screen, measures to increase the definition of the projected image are essential, and in the past a variety of proposals have been made. For example, in a proposal described in Japanese Patent Laid-open No. 9-326981, a method to obtain high-definition projected pictures is proposed as a picture projection system.

Specifically, the picture projection system comprises means to generate high-definition picture data, picture projection means having a plurality of projectors to project at least part of the above high-definition picture data, and picture processing means to select and process at least part of the above high-definition picture data for output to the above plurality of projectors.

In such a picture projection system, a projection method is executed in which the above picture projection means is used to partially overlap the pictures of each projector to form a single large picture, and moreover picture processing is performed by the above picture processing means such that the overlapping parts of the picture are smoothly connected. To this end, first a digital camera or other picture-taking means takes a picture of reference pictures projected onto the screen by each projector, to capture the positions, colors, brightnesses, and other parameters of each picture. Thereafter, these parameters are referenced to perform calibration processing of the original picture by picture processing means within a personal computer, and smooth connection of projected pictures is achieved by output to each projector. By this means, projected pictures with higher definition are possible.

In the case of the above-described cube-type device, at the time of installation, for example, differences in brightness and color between four devices are calibrated to bring them into coincidence, to raise the definition of the projected picture. In front-projection type devices also, similar to cube-type devices, by executing a calibration method, smooth connections between projected pictures are achieved.

However, in the processing method of the above-described conventional picture projection system and calibration method of cube-type and similar devices, when such processing is executed for a multi-display device installed indoors, for example, in order to project or calibrate colors and brightness more accurately, it has become necessary to darken the room and shut out external light, in order that, there by no adverse effects of ambient external light on image calibration.

However, there are cases in which sunlight cannot be blocked, or in which other persons in the same room are performing some task and cannot extinguish lights within the room. In such cases, the ambient external light adversely affects image calibration, resulting in the problem that a satisfactory high-definition projected image cannot be obtained. This problem is particularly marked when a multi-display device is installed outdoors, and cannot easily be solved.

Further, in conventional multi-display devices it is desirable that, at the least, a clean screen be used for accurate execution of the above-described image calibration processing. Consequently the screen surface must be cleaned. However, there is the added problem that such cleaning has conventionally entailed complex tasks, and has been troublesome.

As explained above, in conventional picture projection systems and multi-display devices, when it is not possible to shut out external light adversely affecting image calibration, for example, if, when installing a multi-display device indoors, it is not possible to block out sunlight, or if other persons are performing tasks in the same room and lights in the room cannot be extinguished, the ambient external light adversely affects image calibration, and as a result satisfactory high-definition projected images cannot be obtained. Such problems are especially prominent when a multi-display device is installed outdoors, and resolution of such problems is extremely difficult.

SUMMARY OF THE INVENTION

This invention was devised in light of the above problems, and has as an object the provision of an image calibration device and image calibration method which is capable of blocking out external light in the vicinity of the device, which is of simple construction, and which is capable of accurately performing image calibration processing.

The image calibration device of this invention is an image projection device which projects a plurality of images onto different positions on a screen by means of a plurality of image projection devices (projectors), and which calibrates the image by using an image pick-up device to take a picture of the image on the screen formed in this way, and which is characterized in comprising a shielding member, provided so as to extend from the screen toward the image pick-up device and to be located outside the area surrounded by lines connecting all or part of the screen and the image pick-up device, to block outside light, the image pick-up device, to take pictures of images on the screen projected by at least one of the plurality of projectors and, a calibration device which calibrates the conditions for projection of the projectors, based on image data obtained from the picture-taking results.

The image calibration method of this invention is a method for calibrating images by using a plurality of image projection devices (projectors) to project a plurality of images onto different positions of a screen by, and using an image pick-up device to take pictures of the images thereby formed on the screen, comprising the steps of providing a shielding member which shields external light, so as to extend from the screen toward the image pick-up device and to be located outside the area surrounded by lines connecting all or part of the screen and the image pick-up device, projecting a plurality of images at different positions on the screen by the plurality of projectors, taking pictures of images on the screen projected by at least one of the plurality of projectors, by using the image pick-up device, calibrating the projection conditions of the image projection devices based on the image data obtained from these results, and, after taking pictures using the image pick-up device, removing the shielding member from the image area on the screen on which images are displayed and from the space located in the normal direction of this image area.

DESCRIPTION OF THE PREFERRED EMBODIMENTS

Figure 1:
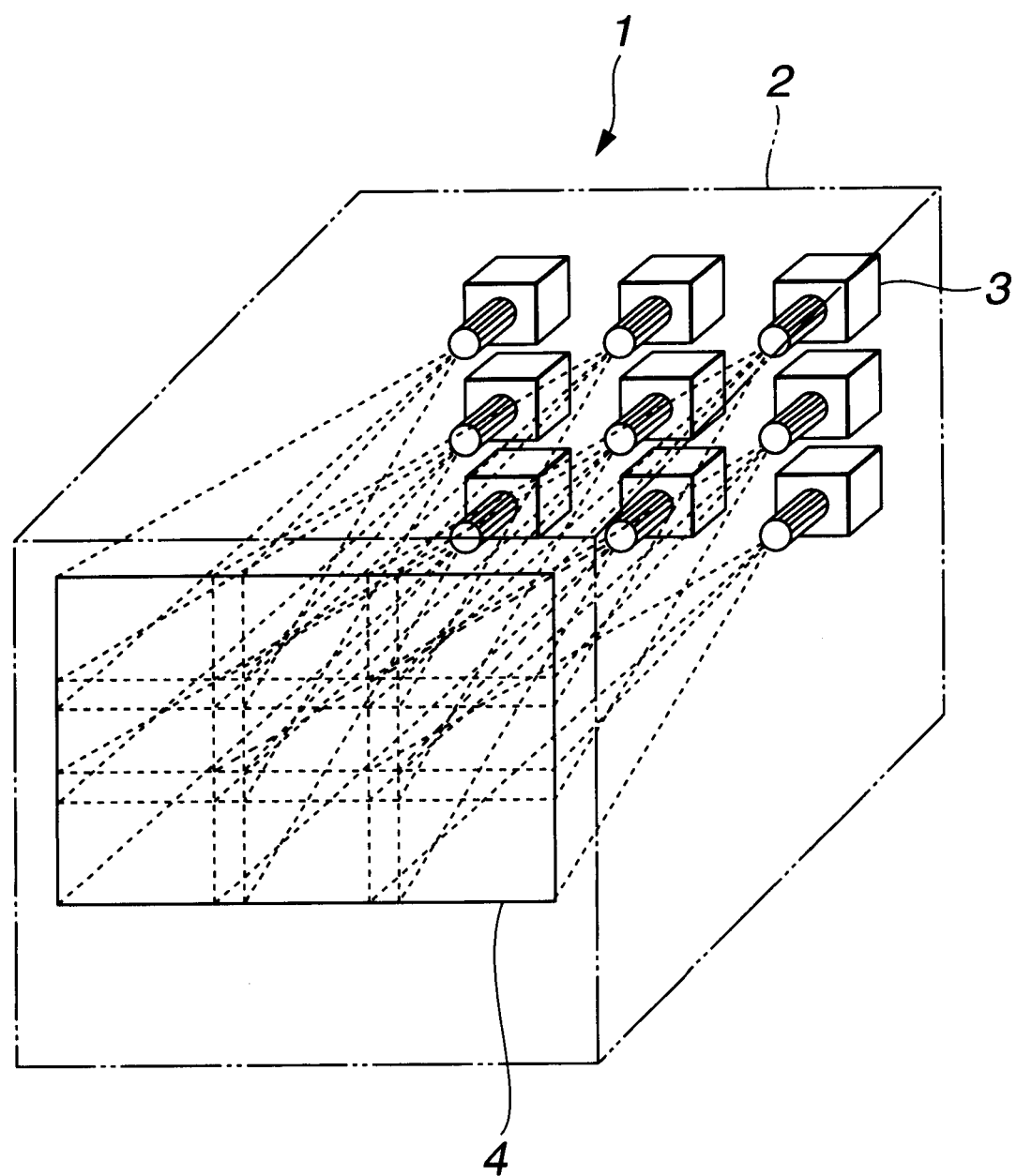
FIG. 1 is a perspective view showing a back-projection multi-display device.

Below, aspects of this invention are explained, referring to the drawings.

Figure 2:
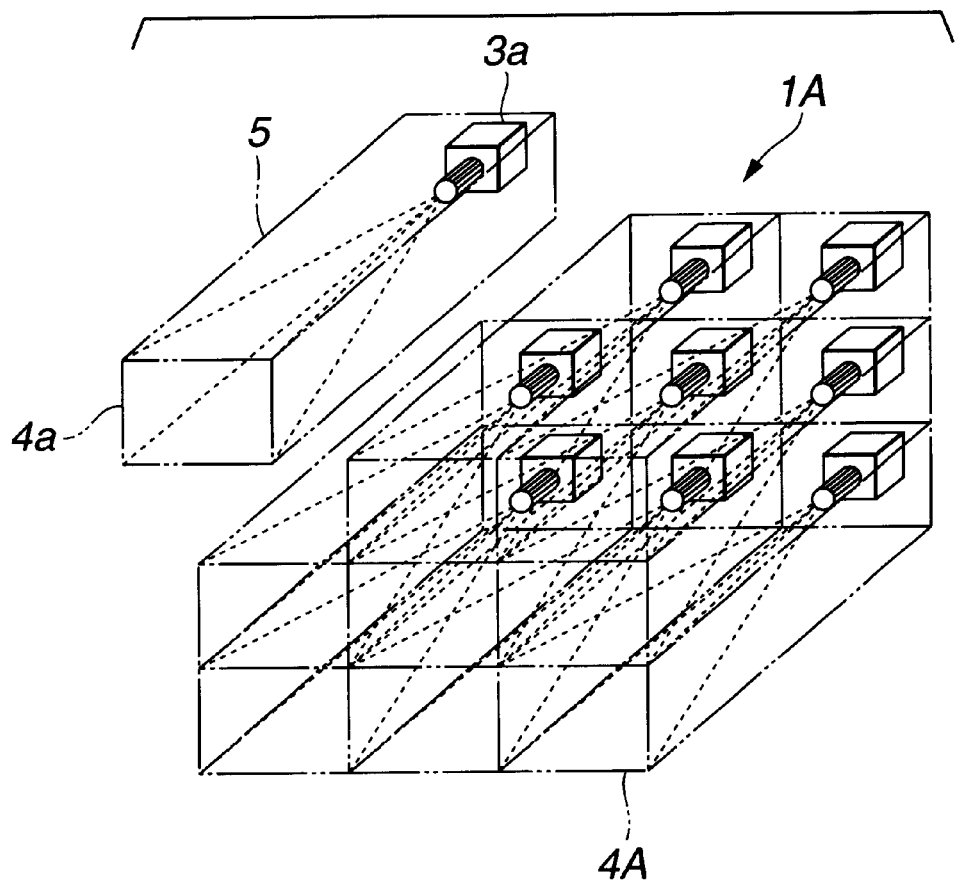
FIG. 2 is a perspective view showing a cube-type back-projection multi-display device.
Figure 3:
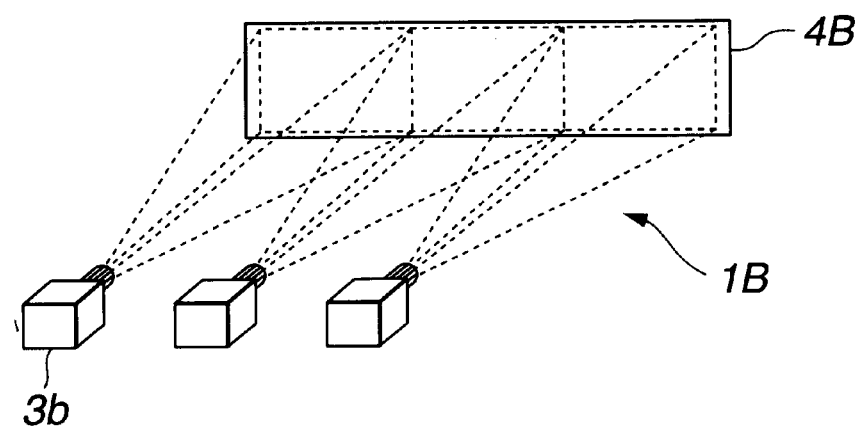
FIG. 3 is a perspective view showing a front-projection multi-display device.
Figure 4:
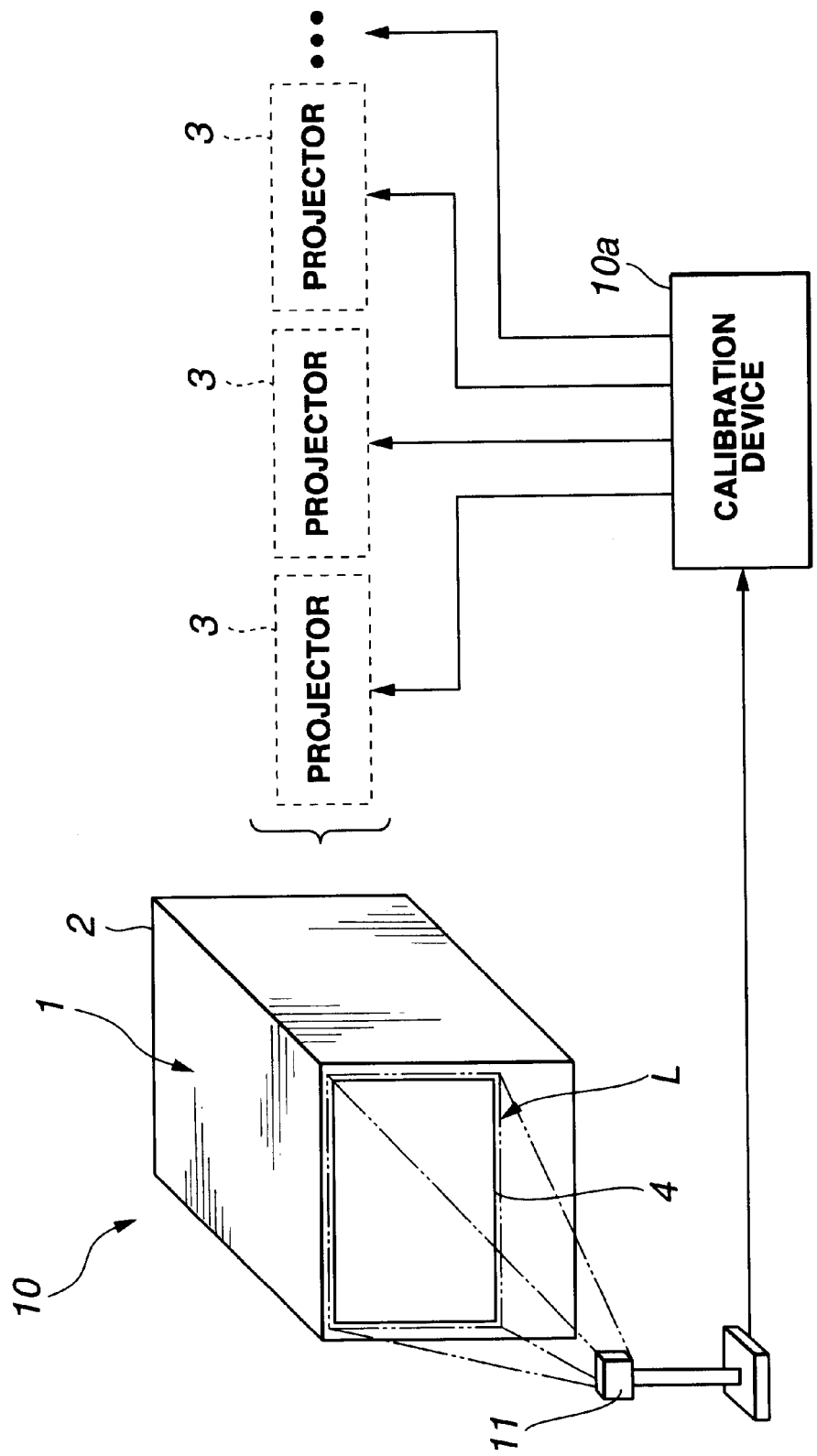
FIG. 4 is a block diagram including a perspective view, used to explain the basic principle of the image calibration device of this invention.

FIGS. 1 through 3 show the configuration of multi-display devices related to the image calibration device of this invention. FIG. 1 is a perspective view showing a back-projection multi-display device. FIG. 2 is a perspective view showing a cube-type back-projection multi-display device. FIG. 3 is a perspective view showing a front-projection multi-display device. Also, FIG. 4 is a block diagram including a perspective view, used to explain the basic principle of the image calibration device of this invention.

First, the general configuration of a multi-display device capable of accommodating the image calibration device of this invention is explained.

The image calibration device of this invention can be applied, for example, to the image projection system described in the above-mentioned Japanese Patent Laid-open No. H9-326981, and is effective for increasing the definition of projected pictures for, at least, the three types of multi-display devices described below.

First, the multi-display device 1 shown in FIG. 1 is configured with a plurality of projectors 3, having image-projection functions, arranged in horizontal and vertical directions on the back face of a housing 2. FIG. 1 shows the case of configuration as a 3×3 back-projection multi-display device, with three projectors 3 arranged in the horizontal direction and three projectors 3 arranged in the vertical direction, however, configurations are also possible in which m×n (m=1,2,3,4, . . . , n=1,2,3,4, . . . ) projectors 3 are arranged in the vertical and horizontal directions.

On the front face of the housing 2 is provided a single screen 4. Projected pictures from the above nine projectors are projected onto this screen 4.

In a multi-display device configured in this way, at the time of projection, the projected pictures of each of the projectors 3 are projected and combined so as to mutually overlap, as shown by the broken lines in FIG. 1. With respect to these overlapping parts, an image calibration function provided within the device, such as for example that described in the above-mentioned Japanese Patent Laid-open No. 9-326981, can be used to perform picture calibration processing on the original pictures provided to each projector, so that seams between projected pictures cannot be seen.

The second type of multi-display device is shown in FIG. 2.

As shown in FIG. 2, this type of multi-display device 1A is a back-projection multi-display device configured with a plurality of what are called cube-type box-shaped display devices 5 arranged in the horizontal and vertical directions to make up a single screen surface 4A.

A single display device (also called a cube) 5 is configured to include a single projector 3a and single screen 4a. The projected picture of the projector 3a is projected to fill the corners of screen 4a. FIG. 2 shows the case in which three display devices 5 in the horizontal direction by three display devices 5 in the vertical direction are positioned in an array to configure a 3×3-cube back-projection type multi-display device, however, any configuration of m×n (m=1,2,3,4, . . . , n=1,2,3,4, . . . ) display devices 5 arranged in the vertical and horizontal directions is possible.

For example, when a cube-type device 1A has 3×3 display devices 5, as in FIG. 2, the input signal is divided by picture-division means, not shown, into nine signals (3×3), while performing appropriate enlargement or reduction according to the resolution of the projectors 3a within the cube 5. By sending the divided pictures to the corresponding projectors 3a within the cube 5, a single large picture is projected.

In this case, if for example the input picture is SVGA size (800 horizontal pixels×600 vertical pixels), and projectors 3a within the display device 5 are VGA size (640 horizontal pixels×480 vertical pixels), then the above picture division means (not shown) within the device first receives the input picture, and performs processing to change the picture size as follows.

Horizontal direction: 640×3/800=2.4 times

Vertical direction: 480×3/600=2.4 times

In other words, the picture division means performs enlargement processing by 2.4 times both vertically and horizontally on the received picture, and then divides the picture into equal thirds in both the horizontal and vertical directions to create nine pictures, and sends each picture to the corresponding projector 3a. By this means, a large picture equivalent to the screen area can be projected on a single screen 4A.

In another multi-display device, a plurality of projectors 3b are provided in a row arrangement as shown in FIG. 3, in a front-projection type device 1B which enlarges and projects onto a single screen 4B. The figures show the case in which three projectors are arranged in the parallel direction, however, any configuration of n (n=2,3,4, . . . ) projectors 3b arranged in the horizontal direction is possible.

In this type of multi-display device 1B, the projected images from each of the projectors 3b are displayed in a row on a screen 4B.

Three types of multi-display devices have been explained, when considering image calibration, these types of devices have the problems indicated below.

1: Color, brightness, picture distortion, contrast are different for each projector;

2: In addition, a number of these parameters change with time; and

3: When lamps in the projectors are changed, the parameters in 1 above change.

As one means to resolve these problems, workers may employ the calibration functions of each projector to perform calibration by visual inspection, and in fact this method is widely used. However, using such a calibration method, time is required for calibration, and calibration depends on worker subjectivity, so that calibration accuracy is not stable, and other problems arise as well.

On the other hand, it is possible to project a calibration pattern from each projector, take a picture of this with a digital camera, measure colors with a colorimeter and calculate calibration amounts by computer to perform image calibration. Further, by transforming the original picture data based on the above measured calibration amounts, differences in projected pictures can be eliminated without using the calibration functions of projectors. For example, when the projected picture of a given projector is reddish using certain picture data, by reducing the red component of the picture data sent to this projector, the picture displayed on the screen can be made to ultimately assume the colors of the original picture.

In other words, the method and device of such image calibration can adopt the method and device used in the picture projection system described in Japanese Patent Laid-open No. H9-326981.

However, when the above picture projection system is used and a picture is taken of a calibration pattern using a camera and colorimeter, if external light is present, measurement values will not be correct, and calibration will be inaccurate. Consequently when an indoor location cannot be darkened while taking pictures, or when using a multi-display device outdoors, appropriate image calibration cannot be performed.

This invention solves the above problem by using means to block out external light. The basic principle of the image calibration system device of this invention is explained, referring to FIG. 4.

As shown in FIG. 4, the image calibration device 10 of this invention comprises a configuration approximately similar to the picture projection system described in Japanese Patent Laid-open No. H9-326981. The image calibration device 10 comprises a multi-display device 1. The multi-display device 1 has a single screen 4, installed in front of the multi-display device 1, and on which a plurality of images are projected, and a plurality of projectors 3, provided on the back-face side within the housing 2, as image projection means for projecting images onto different positions of the screen 4. This image calibration device 10 further comprises a digital camera or other image pick-up device 11, which uses a CCD to take pictures of images on the screen 4 projected and formed by at least one among the plurality of projectors 3, and a calibration device 10a which calibrates the projection conditions of the above plurality of projectors based on the picture data obtained from this image pick-up device 11.

In other words, first a calibration pattern is projected onto the screen 4 from each projector 3, under control by a personal computer or other calibration device 10a. A picture is taken of the projected image by a digital camera or other image pick-up device 11, or a colorimeter or similar is used to measure colors and obtain data of the captured picture, and this captured picture data is supplied again to the calibration device 10a. The image pick-up device 11 is positioned in front facing the screen 4 of the multi-display device 1 in a representative user viewing position, and is set so as to enable picture-taking of an area including the entire screen 4 (picture-taking range L). A shielding member 12, described below, is provided outside an area enclosed by lines connecting all or part of the screen 4 and the image pick-up device 11 (see FIGS. 5 and 5a).

In the calibration device 10a, picture processing means provided within the picture projection system described in the above-described Japanese Patent Laid-open No. H9-326981, for example, is used to calculate parameters for picture positioning, color adjustment, brightness adjustment, and to perform other calibrations and corrections, using the supplied picture data. Based on the calculation results, the original picture data is transformed, signals indicating projection conditions for each of the projectors 3 are generated and supplied, and image calibration control of the projected pictures of each of the projectors 3 is performed. By this means, a high-definition projected picture can be obtained which takes advantage of the resolution of the input picture.

After taking a picture with the image pick-up device, the shielding member is removed from the image area on the screen on which images are displayed and from the space in directions normal to the image area.

Figure 5:
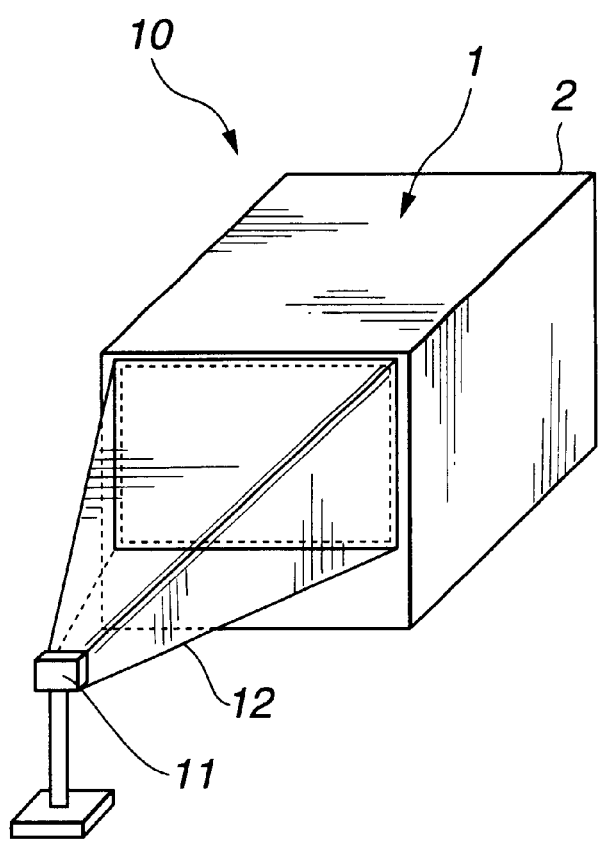
FIG. 5 is a perspective view showing one aspect of an image calibration device of this invention.

In the image calibration device 10 of the above configuration, in order to further improve the accuracy of measurement by means of the above image pick-up device 11 even when there is ambient external light, in order to correctly and reliably perform image calibration, a configuration like that shown in FIG. 5 may be used enabling the shielding of external light when taking pictures. Hence if the shielding member 12 having a shape and optical characteristics such that there is no influence on the picture-taking area of the image pick-up device 11, and such that ambient external light is shielded, is positioned between the image pick-up device 11 and the screen 4 of the multi-display device 1, then ambient external light can be shielded, measurement accuracy can be improved, and accurate and reliable image calibration can be performed. The inner surface of the shielding member consists of material with an optical reflectivity at or below a prescribed value. Below are described a plurality of aspects of the image calibration device 10 of this invention, actually comprising such a shielding member 12.

To begin with, a first aspect of the invention is explained.

The image calibration device 10 of the first aspect of this invention is configured with, in addition to the principal components explained in FIG. 4, a shielding member 12 having a shape and optical characteristics such that the picture-taking area of the image pick-up device 11 is not affected, yet ambient external light is blocked, as in FIG. 5.

Figure 5A:
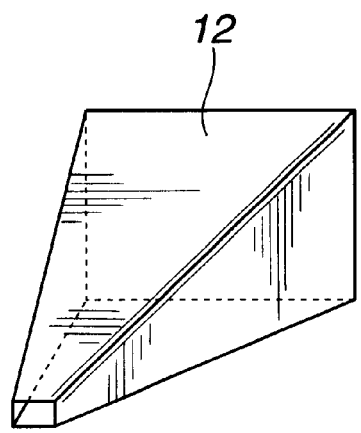
FIG. 5A is a perspective view of the shielding member of the first aspect.

FIG. 5 is a perspective view showing the first aspect of an image calibration device of this invention. FIG. 5A is a perspective view of the actual shielding member of the first aspect.

Specifically, the shielding member 12 is formed in a tetragonal pyramid so as to enclose the picture-taking area of the image pick-up device 11. The aperture on the base side of the tetragonal pyramid can be installed such that the entire screen 4 is included, and moreover the aperture at the upper end of the tetragonal pyramid is cut such that the light-receiving part of the image pick-up device 11 can be mounted. The image pick-up device 11 and the shielding member 12 form a single unit, but are installed for free attachment and removal.

When installing the shielding member 12 onto the multi-display device 1, the image pick-up device 11 is installed in the aperture at the upper end of the tetragonal pyramid. Simultaneously, the aperture at the base end is installed so as to be in contact with the screen 4, and such that its state is retained.

By this means, the screen 4 and the light-receiving part of the image pick-up device 11 can be completely shielded from ambient external light by means of the shielding member 12. As a result, the measurement accuracy of the above image pick-up device 11 is improved, and correct and reliable image calibration can be performed, enabling higher-definition projected pictures.

It is important that there be no reflection of light on the inside surface of the above shielding member 12, and a material with high optical absorptivity must be selected. Hence either the entirety of the shielding means 12 or the inner surface of same should be, for example, of a material with a matte finish, black in color, or with similar optical characteristics. The focal point of the digital camera used as the image pick-up device 11 should be adjusted in advance on a surface position of the screen 4, or should be so set.

Hence by means of this aspect, a simple configuration can be used to shield ambient external light and enable accurate image calibration processing.

Next, a second aspect is explained.

Figure 6:
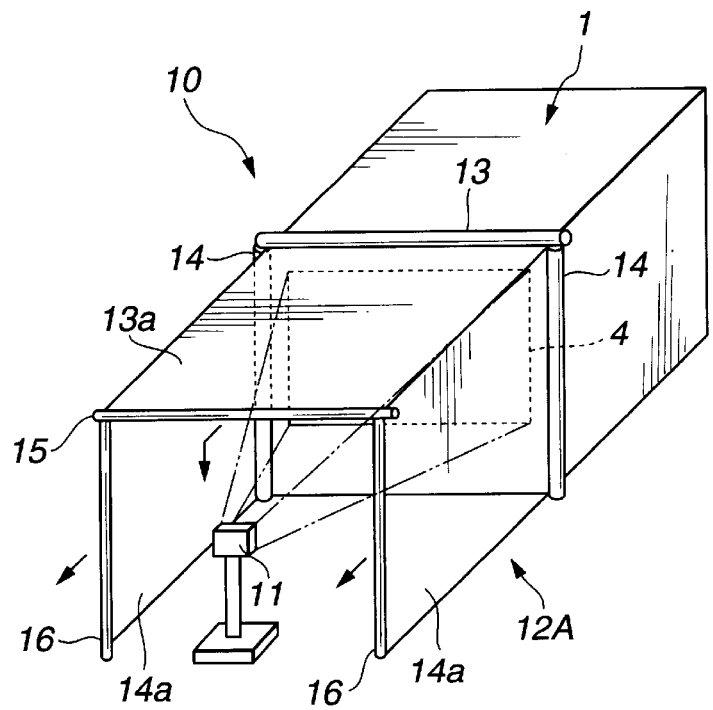
FIGS. 6 and 6A are perspective views showing a second aspect of the image calibration device of this invention.
Figure 6A:
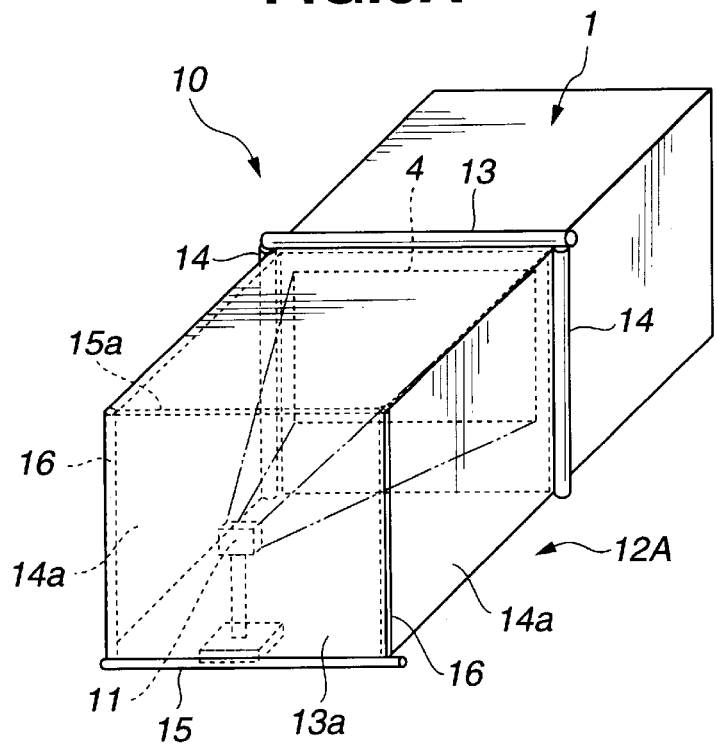

FIG. 6 shows a second aspect of the image calibration device of this invention. FIGS. 6 and 6A are perspective views showing a second aspect of the image calibration device of this invention. In FIG. 6, component parts similar to those of the device shown in FIG. 5 are assigned the same symbols, and an explanation is omitted; only differing parts are explained.

In this aspect, the handling properties and storage properties of the shielding means are further improved.

Specifically, as shown in FIG. 6, the image calibration system device 10 of this aspect is provided with a shielding member 12A differing from the shielding member 12 shown in FIG. 5, and comprising three cloth-housing receptacles 13, 14, in which are wound rolled-up sheet-shape cloths 13a, 14a.

The cloth-housing receptacle 13 is latched by latches (not shown) and installed to the top part of the multi-display device 1 on the screen side. When performing measurements using the image pick-up device 11, for example, a support 15 fastened to a base end of the wound-up cloth 13a is pulled horizontally from the cloth-housing receptacle 13. By further pulling the cloth 13a and moving the back face of the image pick-up device 11 in the vertical direction and hanging in the direction shown by the arrow, external light can be shielded by this cloth 13a from the upper side and back side of the image pick-up device 11 and screen 4.

The other two cloth-housing receptacles 14 are configured similar to the above cloth-housing receptacle 13, and are latched by latches (not shown) and installed to, at least, both sides on the screen side of the multi-display device 1. When performing measurements using the image pick-up device 11, supports 16 fastened to a base end of the similarly wound-up cloths 14a are pulled horizontally from the cloth-housing receptacles 14. By pulling each to positions such that the sides of the image pick-up device 11 are hidden, that is, to the position of the cloth 13a shielding the back side of the above image pick-up device 11, external light can be shielded by the cloths 14a with respect to both sides of the image pick-up device 11 and screen 4. As shown in FIG. 6A, by installing separate support rods 15a on the top ends of the supports 16, folding of the cloth 13a pulled out from the cloth-housing receptacle 13 can be prevented.

As shown in FIG. 6A, through such shielding means 12A configured from three cloth-housing receptacles in which are wound up rolled-up cloths in sheet form, ambient external light can be completely shielded.

In this aspect, in addition to advantageous results similar to those of the above first aspect, a shielding member 12A configured from three cloth-housing parts 13, 14, in which are wound cloths in roll form, is used. Hence handling of the shielding member 12A during setting of values is easier than in the above first aspect, so that of course efficiency of operations is improved, moreover, there is no need for storage within the multi-display device 1, so that storage properties of the shielding member 12A can also be improved.

In this aspect, an explanation was given of the case in which supports 15, 16 are fixed to base ends of the wound-up cloths 13a, 14a within the respective cloth-housing parts 13, 14, however, the supports 15, 16 may also be separate and unattached. However, in this case during setup of the shielding member 12A, the shielding member 12A is assembled while supporting the base ends of the respective cloths 13a, 14a.

Next, a third aspect of the invention is explained.

Figure 7:
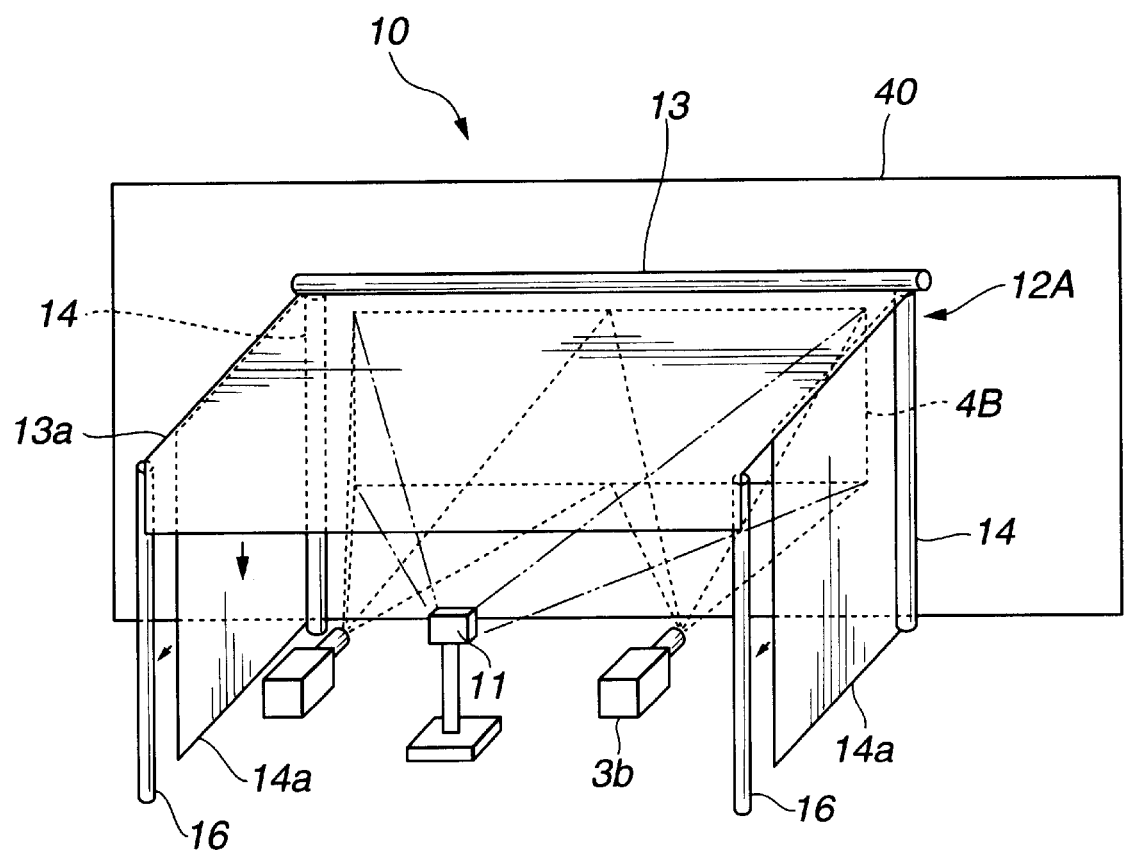
FIG. 7 is a perspective view showing a third aspect of the image calibration device of this invention.

FIG. 7 shows a third aspect of the image calibration device of this invention, and is a perspective view showing the overall configuration of a device when the shielding means of the above second aspect is applied to a front-projection type multi-display device. In FIG. 7, component parts similar to those of the device shown in FIG. 6 are assigned the same symbols, and an explanation is omitted, only differing parts are explained.

In this aspect, the shielding means 12A is configured to enable application to a front-projection type multi-display device 1B. In other aspects the configuration is similar to the image calibration device 10 of the above second aspect. The following explanation is for an example in which supports are not fixed to the base ends of the cloths 13a, 14a of the cloth-housing receptacles 13, 14 in the second aspect.

As shown in FIG. 7, the shielding member 12A is configured approximately similarly to the shielding member shown in FIG. 6, but the width shape of the cloth-housing part 13 is formed in a width such that all of a plurality of projectors 3b are covered. Each of the cloth-housing parts 13, 14 is configured to enable free attachment to and removal from a wall 40 or similar on which the screen 4B is installed.

By means of the above configuration, advantageous results similar to those of the above second aspect are obtained, and in addition the plurality of projectors 3b, screen 4B, and image pick-up device 11 comprised by the front-projection type multi-display device 1B can be covered as a single shielded space by the cloths 13a, 14a pulled out from each of the cloth-housing parts, so that external light can be reliably shielded.

Hence in this aspect, by configuring the shielding means 12A to enable application to a front-projection type multi-display device 1B, advantageous results similar to those of the above second aspect can be obtained even in the case of front-projection type multi-display devices.

Next, a fourth aspect of the invention is explained.

Figure 8:
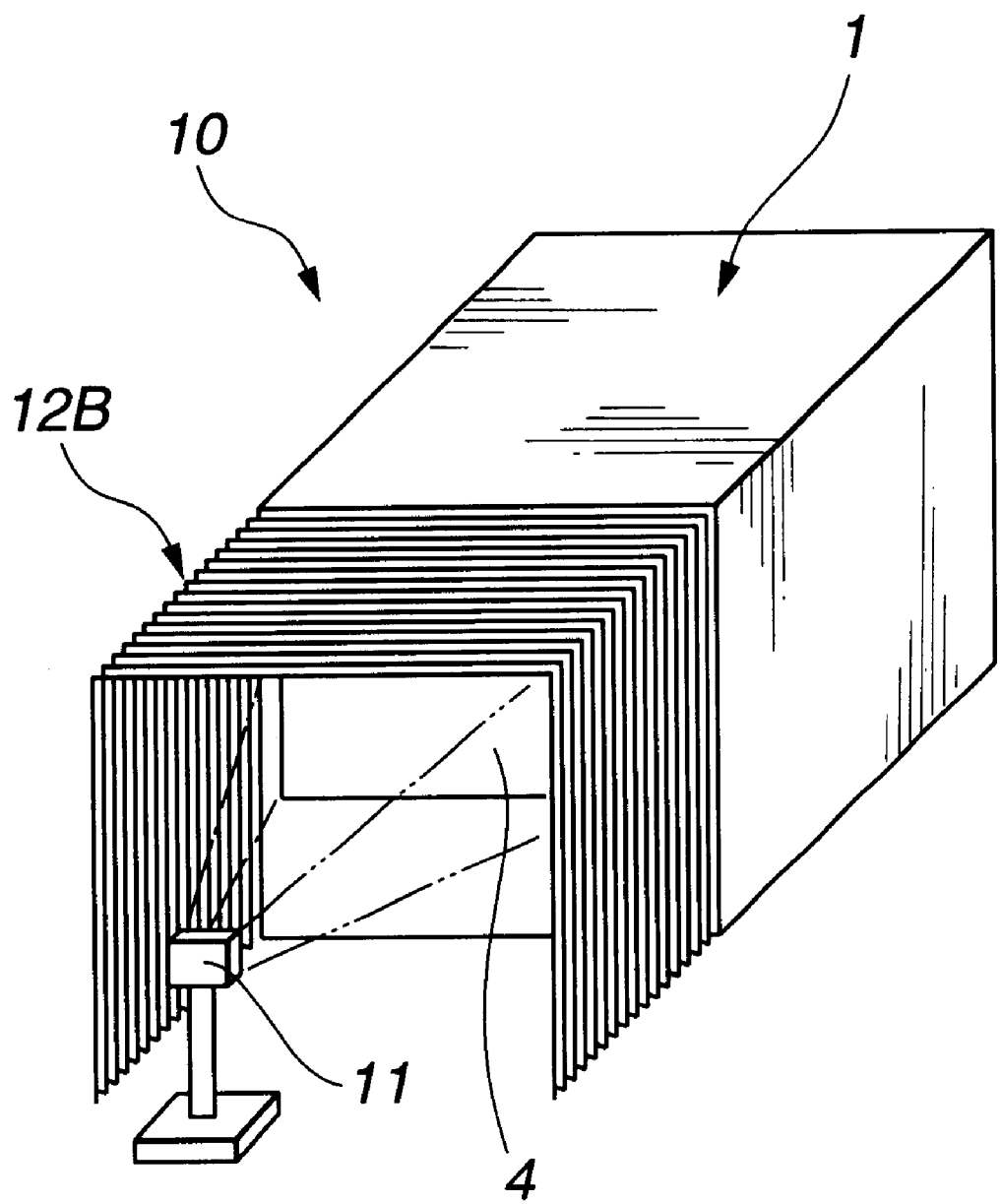
FIG. 8 is a perspective view showing a fourth aspect of the image calibration device of this invention, and showing the shielding member in a state of partial expansion.
Figure 9:
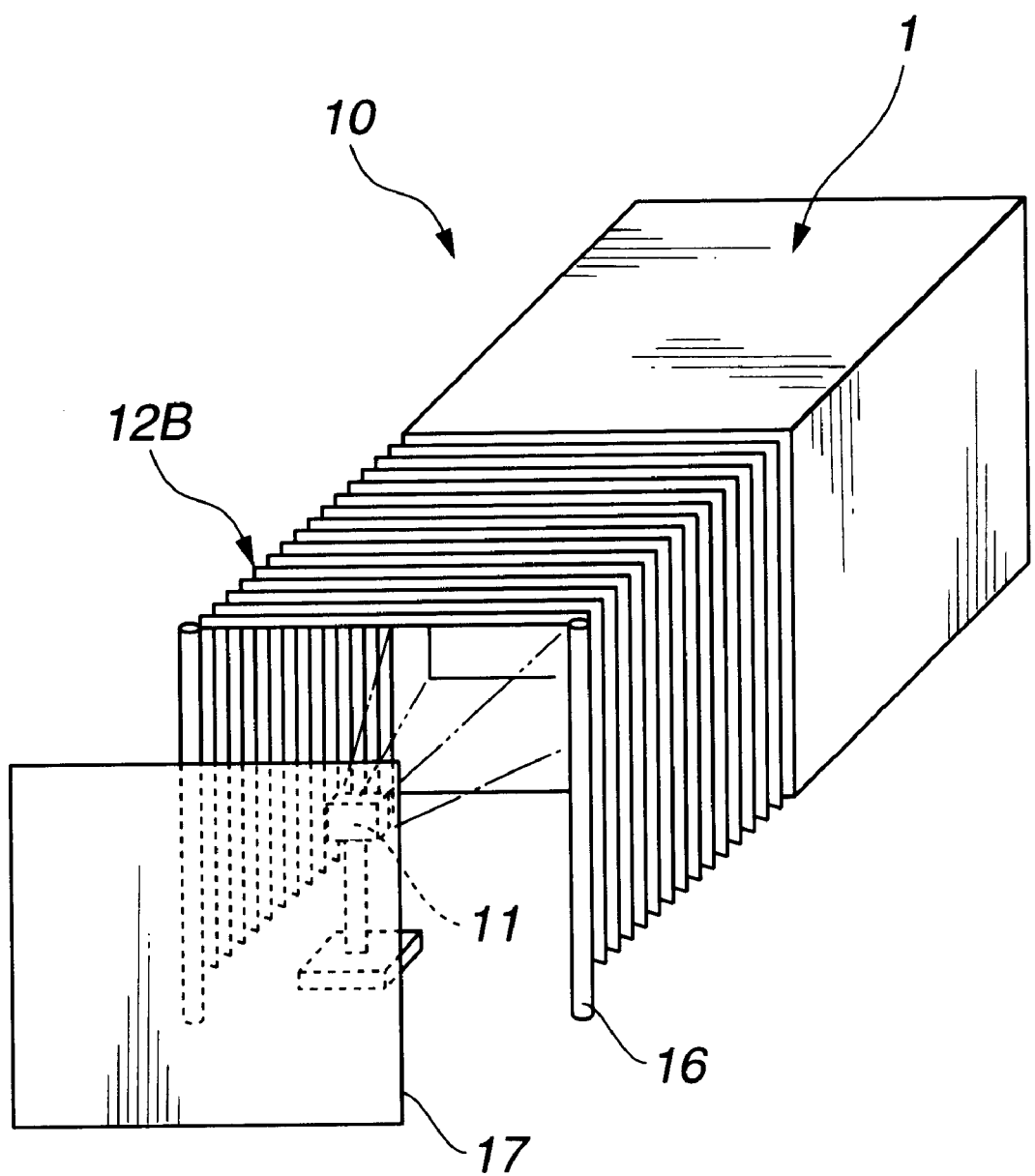
FIG. 9 is a perspective view showing the shielding member of FIG. 8 completely expanded, and with the back face covered by another cloth.

FIGS. 8 and 9 show a fourth aspect of the image calibration device of this invention, and are perspective views showing the overall configuration of the device in the case in which the shielding member of the above second aspect is configured in a bellows structure. FIG. 8 is a diagram showing the state in which the shielding member is partially expanded. FIG. 9 shows the state in which the shielding member is completely expanded, and in addition the back surface is covered by another cloth. In FIGS. 8 and 9, component parts similar to those of the device shown in FIG. 6 are assigned the same symbols, and an explanation is omitted; only differing parts are explained.

In this aspect, in order to further improve the storage properties and handling properties of the shielding member over those of the above second aspect, in place of the shielding member 12A shown in FIG. 6, a bellows-structure shielding member 12B is provided. Other aspects of the configuration are similar to those of the image calibration device 10 of the above second aspect.

As shown in FIG. 8, the shielding member 12B used in the image calibration device 10 of this aspect is configured with a shielding cloth in a U-shape formed in a bellows-shape, enabling free contraction and extension to a distance equal to or greater than the distance between screen 4 and image pick-up device 11. Of course when the member is extended, the U-shape is maintained.

When such a shielding member 12B is not used, it is folded into and stored in the front part of the housing, not shown, of the multi-display device 1. Or, the shielding member 12B may be formed in a freely contracting and expanding sheet shape, folded into and stored within the display device which stores the above image projection device when not in use.

During measurements by the image pick-up device 11, when using the above shielding member 12B, the bellows-structure cloth of the shielding member 12B is pulled out from the front part of the multi-display device 1, and further pulled so as to extend in the horizontal direction as shown in FIG. 8, moving until the position on the back side of the image pick-up device 11. In this case, because the cloth of the shielding member 12B has a bellows structure, it can easily be moved.

When the bellows-structure cloth reaches the back-face side of the image pick-up device 11, the back-face side of the image pick-up device 11 must be covered. In this example, as shown in FIG. 9, a separate shielding sheet member 17, or a hanging cloth, is provided. By this means external light on the back side of the image pick-up device 11, for which the bellows-structure shielding member 12B is insufficient, is shielded. In this case, as shown in FIG. 9, a plurality of supports 16 may be provided in the base-end part of the shielding member 12B, configured such that the above sheet member 17 or cloth is fixed in place to these supports 16.

By this means, the image pick-up device 11 and screen 4 can be completely shielded using a shielding member 12B configured from a bellows-shaped cloth and from a sheet member or cloth 17.

Hence in this aspect, by using a shielding member 12B configured from a shielding cloth in bellows shape, advantageous results similar to those of the above second aspect are obtained. In addition, handling of the shielding member 12B during setting of values is easier than in the above second aspect, so that of course efficiency of operations is improved, moreover, storage in the front side of the multi-display device 1 is possible, so that storage properties can also be improved, and the external appearance can be made satisfactory.

Next, a fifth aspect of the invention is explained.

Figure 10:
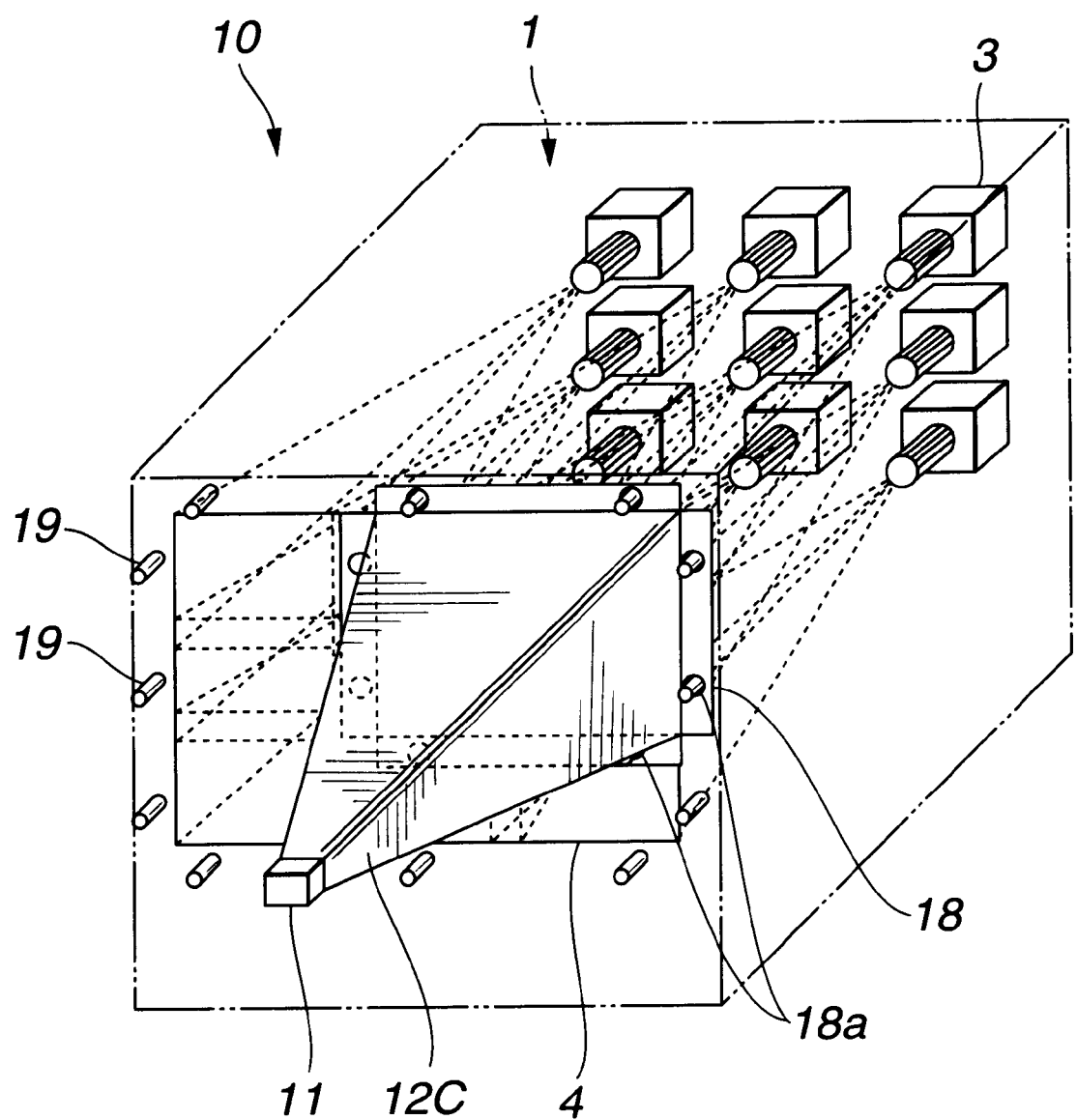
FIG. 10 is a perspective view showing a fifth aspect of the image calibration device of this invention.

Here an aspect of the invention is explained which enables reduction in the size of the shielding means of the image calibration device of this invention. FIG. 10 shows the fifth aspect of the image calibration device of this invention, and is a perspective view showing the overall configuration of a device enabling reduction in size of the shielding member. In FIG. 10, component parts similar to those of the device shown in FIG. 5 are assigned the same symbols, and an explanation is omitted, only differing parts are explained.

When performing image calibration using the image calibration device, when for example the display area of the screen 4 is large, and when the image pick-up device 11 has characteristics with a narrow picture-taking area, it may not be possible to take a picture of the entire screen at once. Hence the image calibration device of this aspect is configured such that the shielding member 12C shields part of the screen 4, in order to accommodate such cases.

The following are advantages of this method.

1: By repeatedly performing operations to eliminate differences in neighboring projectors 3, overall differences can be eliminated. For example, in the example shown in FIG. 10, four measurements are performed, in the upper right, lower right, upper left, and lower left. By thus dividing the screen, there is the advantage that the shielding member 12C can be made small.
2: When the screen 4 is large, and the digital camera used as the image pick-up device 11 cannot take a picture of the entire screen at once, division enables image calibration.
3: When the total number of pixels on the screen is large, and the resolution of the digital camera used as the image pick-up device 11 is insufficient for appropriate calibration, appropriate image calibration can still be performed.

As a result of these advantages, in the image calibration device of this aspect, the tetragonal pyramid-shaped shielding member 12 of the above first aspect is reduced in size according to the sizes of a number of divided multi-screens, as shown in FIG. 10. Using this shielding member 12C, by shifting the shielding member 12C in horizontal and vertical directions relative to the screen 4 with the image pick-up device 11 installed, pictures can be taken of the picture displayed on the entire screen.

Further, extended parts 18, extended along the four edges of the base part of the tetragonal pyramid of the shielding member 12C, are formed. These extended parts 18 are fastened closely to the front surface of the device 1 when the shielding member 12C is installed in the front of the multi-display device 1. A plurality of installation holes 18a are provided, necessary when installing the shielding member 12C to the multi-display device 1 at a prescribed position of each extended part 18 of the shielding means 12C. The image pick-up device 11 and shielding member 12C form a single unit, but are installed for free attachment and removal.

On the periphery of the screen 4 on the front side of the multi-display device 1 are provided a plurality of pins 19, which are latches for installing and positioning the above shielding member 12C.

Hence in this configuration, in the example shown in the figure, when the image calibration device 10 is used for image calibration, the shielding member 12C with image pick-up device 11 installed as described above is shifted in the horizontal and vertical directions with respect to the screen 4, so that four measurements can be performed in the upper right, lower right, upper left, and lower left.

In this case, installation of the shielding member 12C on the multi-display device 1 is performed by simply fitting prescribed pins 19 provided on the front of the multi-display device 1 into installation holes 18a in each extended part 18 in the shielding member 12C, so that accurate positioning and retention in a fixed state are achieved. Of course, by means of the above shielding member 12C, external light can be reliably shielded, so that accurate measurements can be executed repeatedly.

Hence in this aspect, even in cases when a picture of the entire screen cannot be taken at once, the image pick-up device 11 can be used to divide the screen and take pictures in order to perform image calibration. By having the shielding member 12C shield only part of the screen, the shielding member 12C can be made small. Further, reduction of the size of the shielding member 12C also contributes greatly to reduce manufacturing costs and improve storage properties.

Next, a sixth aspect of the invention is explained.

Figure 11:
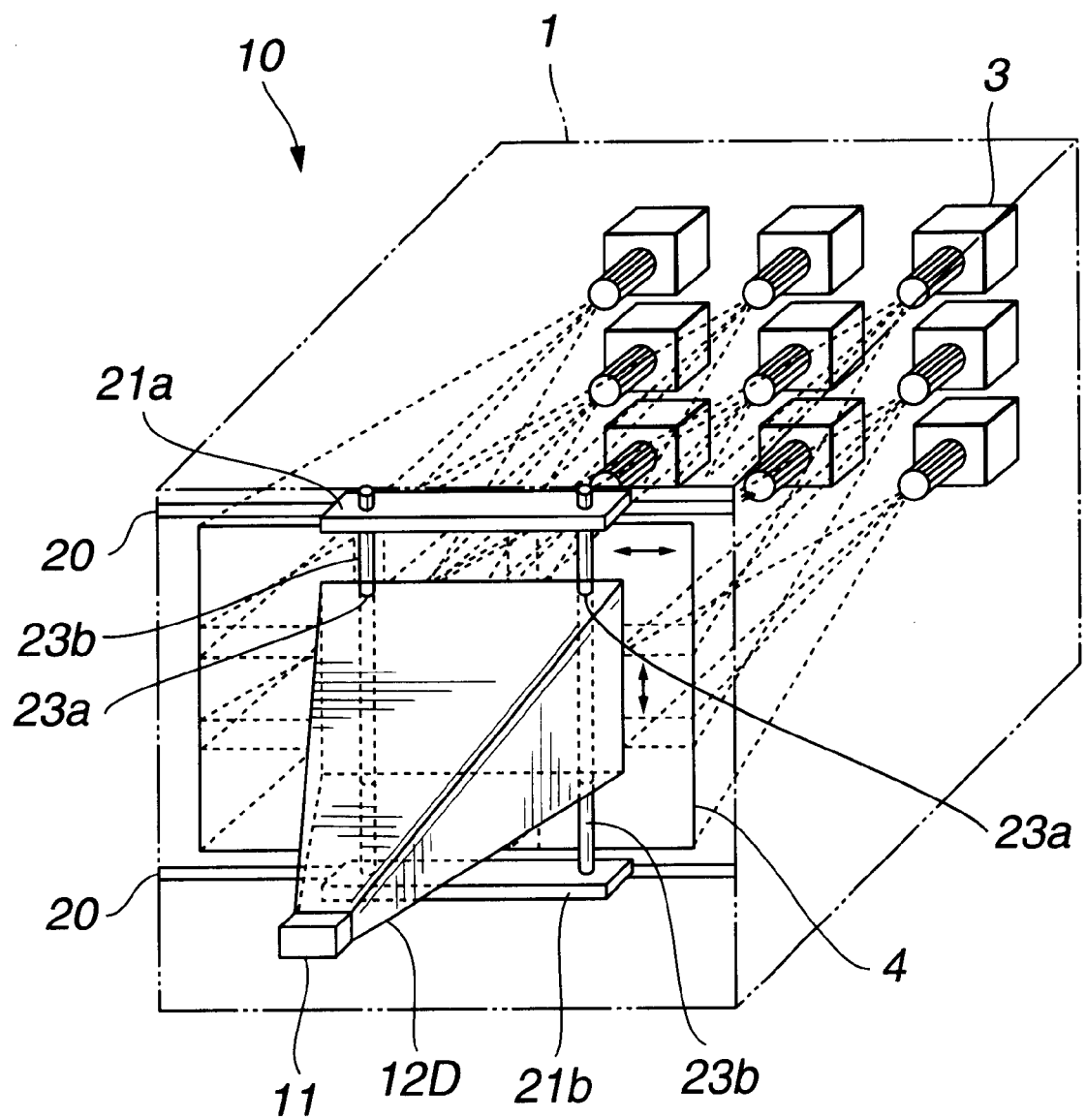
FIG. 11 is a perspective view used to explain a sixth aspect of the image calibration device of this invention.
Figure 11A:
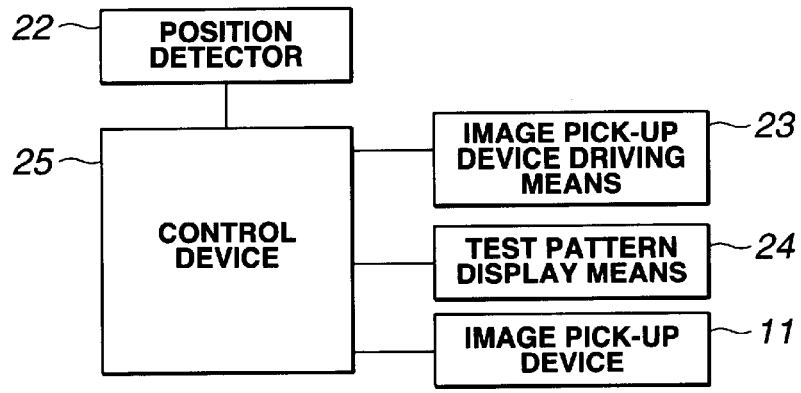
FIG. 11A is a system block diagram used to explain the control system, including shielding member movement control, of the image calibration device of the sixth aspect.
Figure 11B:
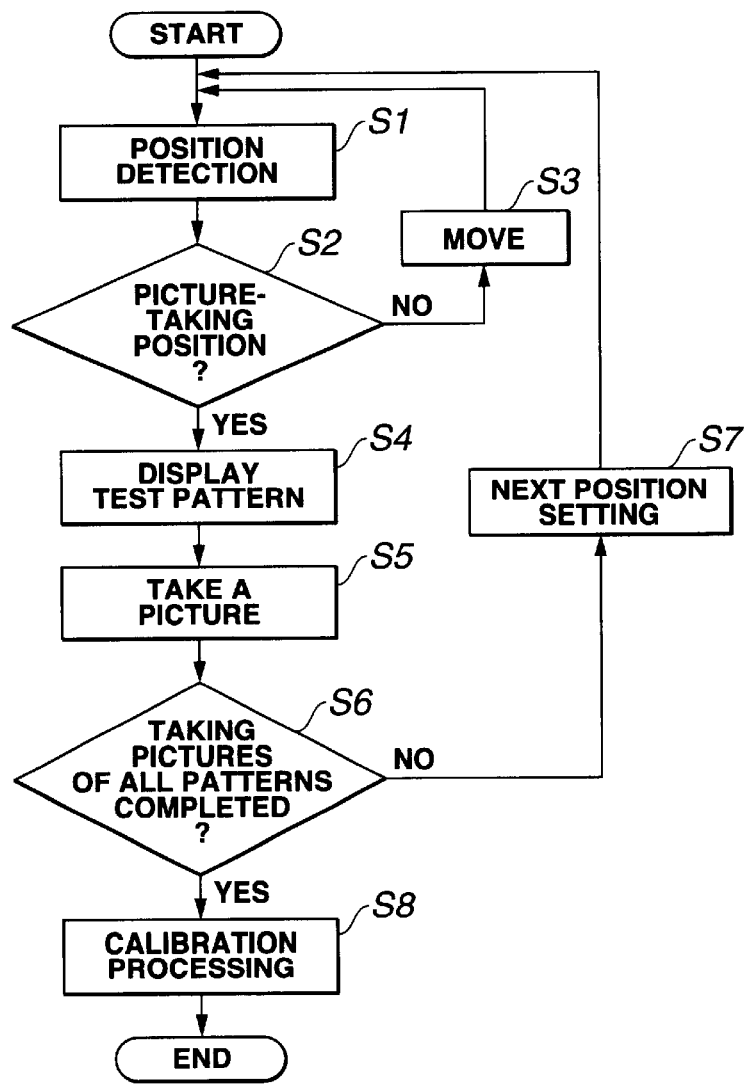
FIG. 11B is a flow chart used to explain control operation of the control system of FIG. 11A.

FIG. 11 through FIG. 11B are diagrams showing a sixth aspect of the image calibration device of this invention. FIG. 11 is a perspective view of the overall configuration of a device in which the shielding means is able to move electrically. FIG. 11A is a block diagram showing a system configuration enabling movement control of the shielding means. FIG. 11B is a flow chart showing an example of control operation of the control device performing movement control. In FIG. 11, component parts similar to those of the device shown in FIG. 10 are assigned the same symbols, and an explanation is omitted, only differing parts are explained.

Specifically, as shown in FIG. 11, the shielding member 12D is configured in a size and shape approximately equal to the shielding member 12C of the above fifth aspect, and by means of the installed image pick-up device 11 is able to take pictures of part of the screen 4. Of course external light can be shielded when each picture is taken. The image pick-up device 11 and shielding member 12D form a single unit, but are installed for free attachment and removal.

Slide holes 23a, passing through slide supports 23b installed in the movement devices 21a, 21b, are formed in both sides of the side faces on the base side near the screen 4 of the tetragonal pyramid of the shielding member 12D. Driving means (not shown) provided inside the movement devices 21a, 21b cause the shielding member 12D to be joined with the slide supports 23b, so that free movement in the vertical direction is possible.

Guide rails 20 to guide the sliding movement of each of the movement devices 21a, 21b in opposed position are installed at the top and bottom parts of the screen 4 on the front side of the multi-display device 1. The movement devices 21a, 21b guided by these guide rails 20 are joined with the above guide rails 20 by driving means (not shown) provided inside, such that free movement of the above shielding member 12D in the horizontal direction is possible. To these movement devices 21a, 21b are fixed one pair of the above slide supports 23b, on which the shielding member 12D is mounted.

The driving means provided within each of the movement devices 21a, 21b are configured from motors or other driving force generation parts, as well as from driving transmission parts the joining or mating parts of which may include gears, cams, belts or similar. Or, the driving means may also be configured from means other than this.

At the base of the tetragonal pyramid of the shielding member 12D, or at the above movement devices 21a, 21b, are incorporated position detectors (not shown) to detect the sliding position.

On the other hand, as shown in FIG. 11A, the electrical circuit system which enables movement control of the shielding means 12D has a plurality of position detectors 22 which detect the position of the shielding member 12D with image pick-up device 11 installed, image pick-up device driving means 23 to perform driving for movement of the above shielding member 12D, test pattern display means 24 provided within the multi-display device 1, and, the image pick-up device 11, installed in the above shielding member 12D. Further, this electrical circuit system is provided within a personal computer or other calibration device 10a, and includes a control device which controls the above image pick-up device driving means based on the above position detection results, and which also controls the projection of test pattern pictures on each projector 3 by the test pattern display means.

Next, movement control operation by means of the above control device 25 is explained in detail, referring to FIG. 11B.

Suppose that the image calibration system device 10 shown in FIG. 11 is used to perform image calibration. First the control device 25 begins the processing shown in the flow chart of FIG. 11B, and in the processing of step S1, performs position detection of the shielding member 12D relative to the screen 4 by means of position detectors 22.

Then, in the processing of step S2, the control device 25 judges from the supplied position detection results whether the shielding member 12D is at the picture-taking position. If judged not to be at the picture-taking position in step 2, the result of step 2 is N (NO), and processing in step S3 controls the image pick-up device driving means 23 to move the shielding member 12D to the picture-taking position, followed by another return to the processing of step S2. If the position is the picture-taking position, and in step S2 the result is Y (YES), processing advances to step S4.

In the processing of step S4, the above shielding member 12D is positioned in the correct picture-taking position, and so the control device 25 controls the test pattern display means 24, and causes the corresponding projector 3 to project a picture based on the test pattern.

Subsequently, in the processing of the continuing step S5, the control device 25 controls the image pick-up device 11 so as to take pictures of the screen on which a picture is displayed based on the test pattern, and processing then advances to step S6.

In the judgment processing of step S6, a judgment is made as to whether picture-taking of pictures based on the test pattern is ended for all of the screen, that is, whether picture-taking is completed. If it is judged in step S6 that picture-taking is not completed, the result of step S6 is N, and in the processing of step S7 the next position is set and processing returns to step S1. If all picture-taking has been completed, the result of step S6 is Y, processing advances to the continuing step S8, and the image calibration processing explained in FIG. 4 is performed.

In this way, through movement control by the control device 25, picture-taking can be performed for the area of the entire screen 4, so that accurate image calibration can be performed. In calibration processing, parts where pictures cannot be taken due to the slide supports 23b in the shielding member shown in FIG. 11 are excluded from processing.

Hence in this aspect, the above shielding member 12D is configured to enable electrical movement control in horizontal and vertical directions with respect to the screen 4, so that in addition to the advantageous results of the above fifth aspect, a series of processes including movement of the image pick-up device 11 and shielding member 12D, projection of test pattern pictures, and picture-taking by the image pick-up device 11 can be automated, to obtain the advantageous result that labor by persons performing calibrations can be greatly alleviated.

Next, a seventh aspect of the invention is explained.

Figure 12:
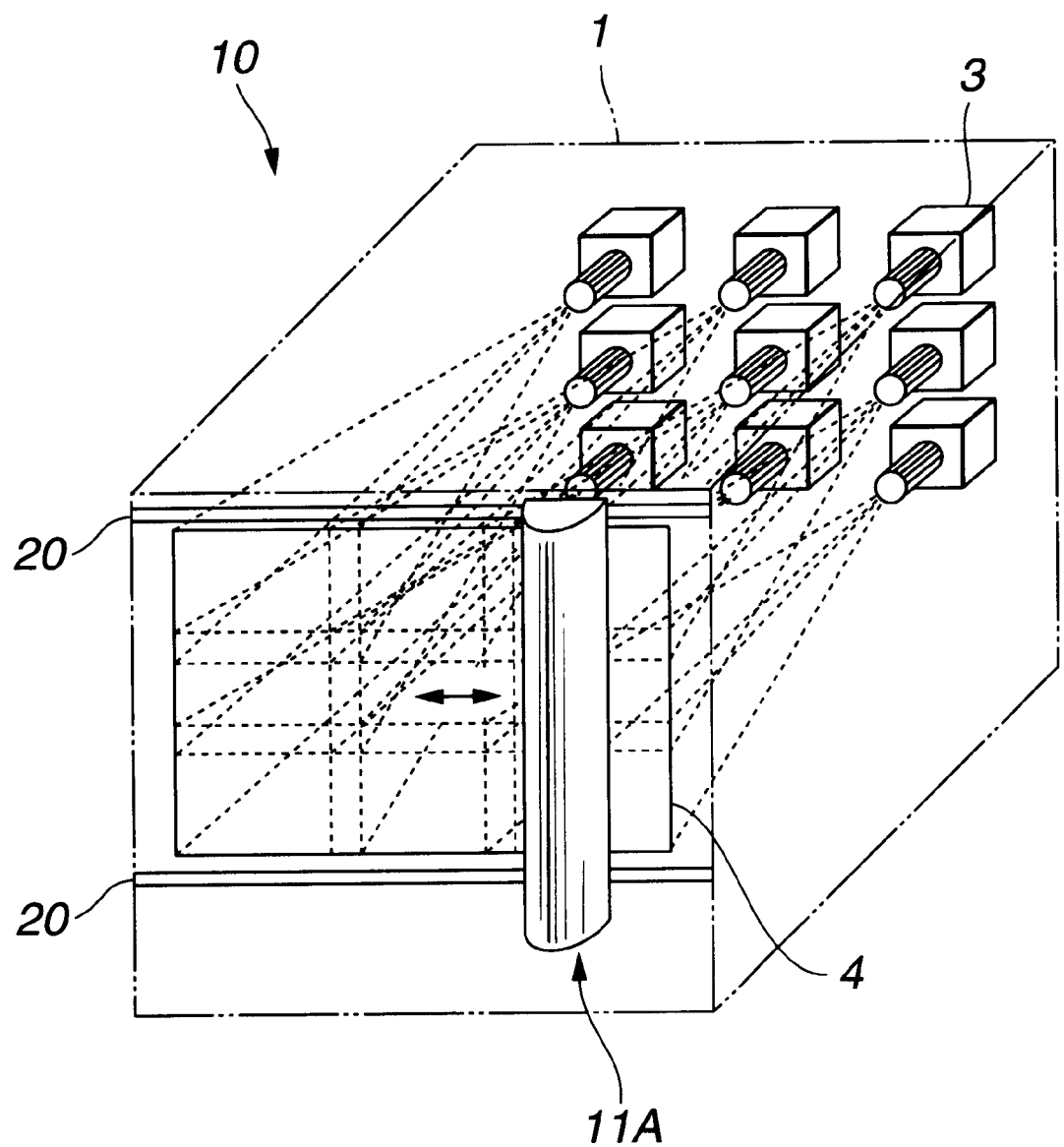
FIG. 12 is a perspective view used to explain a seventh aspect of the image calibration device of this invention.
Figure 12A:
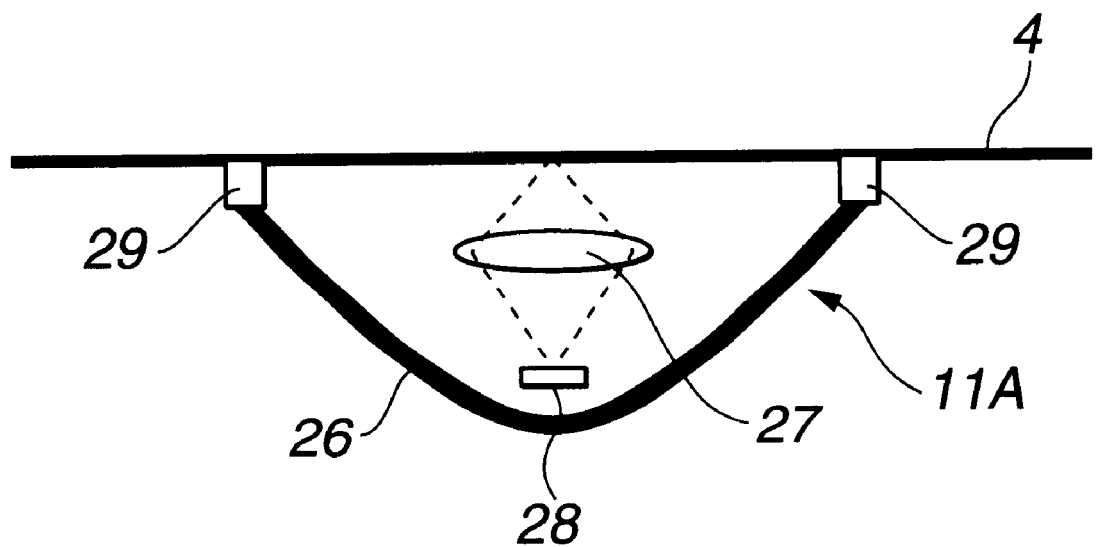
FIG. 12A is an explanatory diagram which explains the configuration of the detection device in FIG. 12.

FIGS. 12 and 12A show a seventh aspect of the image calibration system device of this invention. FIG. 12 is a perspective view showing the configuration of the overall device when using, in place of the above-described image pick-up device and shielding means, a detection device with a different configuration. FIG. 12A is an explanatory diagram which explains the configuration of the detection device in FIG. 12. In FIG. 12, component parts similar to those of the device shown in FIG. 11 are assigned the same symbols, and an explanation is omitted; only differing parts are explained.

In this aspect, in place of the image pick-up device 11 and shielding member 12 of the above-described aspects, a detection device 11A is used which incorporates a displayed picture data capture function similar to that of the image pick-up device 11 and a shielding function similar to that of the shielding member 12.

Specifically, as shown in FIG. 12, guide rails 20 to guide the sliding motion of the above detection means 11A are installed above and below the screen 4 on the front side of the multi-display device 1. The detection device 11A guided by these guide rails 20 is joined with the above guide rails 20 by driving means (not shown) provided at corresponding internal positions, and includes a movement device for free movement in the horizontal direction shown by the arrows.

On the other hand, the detection device 11A comprises, as shown in FIG. 12A, a shield plate 26 formed in, for example, a U-shape, a CCD line sensor 28, installed inside the shield plate 26, provided linearly in the plumb direction in FIG. 12 for scanning of the displayed picture on the screen 4, a lens 27 as the optical system, and two spacers 29 to shield the gap between screen 4 and shield plate 26. If necessary, shielding spacers may also be provided in the gaps between screen 4 and shield plate 26 in the upper and lower parts of the detection device 11A.

Though not shown in the figure, movement control and scanning control of the above detection device 11A are controlled by a control device, not shown, similarly to the above sixth aspect.

Through such a configuration, displayed picture data is read while moving over the screen 4 by means of the picture data scanning function of the above detection device 11A, and simultaneously external light can be shielded during picture data scanning by the shield plate 26 and pair of spacers 29, so that correct displayed picture data can be read. And, compared with the image pick-up device 11 of each of the above aspects, only a small space in front of the screen 4 is required, greatly contributing to compactness.

In this aspect, if the two spacers 29 of the detection device 11A are configured from material with a shielding effect and which is flexible to avoid damage to the screen surface, such as rubber or cloth, or with the elasticity of bristles as in a brush, an effect can be obtained in which the screen is cleaned of dust and other dirt by these spacers 29 accompanying movement of the detection means 11A.

Next, an eighth aspect of the invention is explained.

Figure 13:
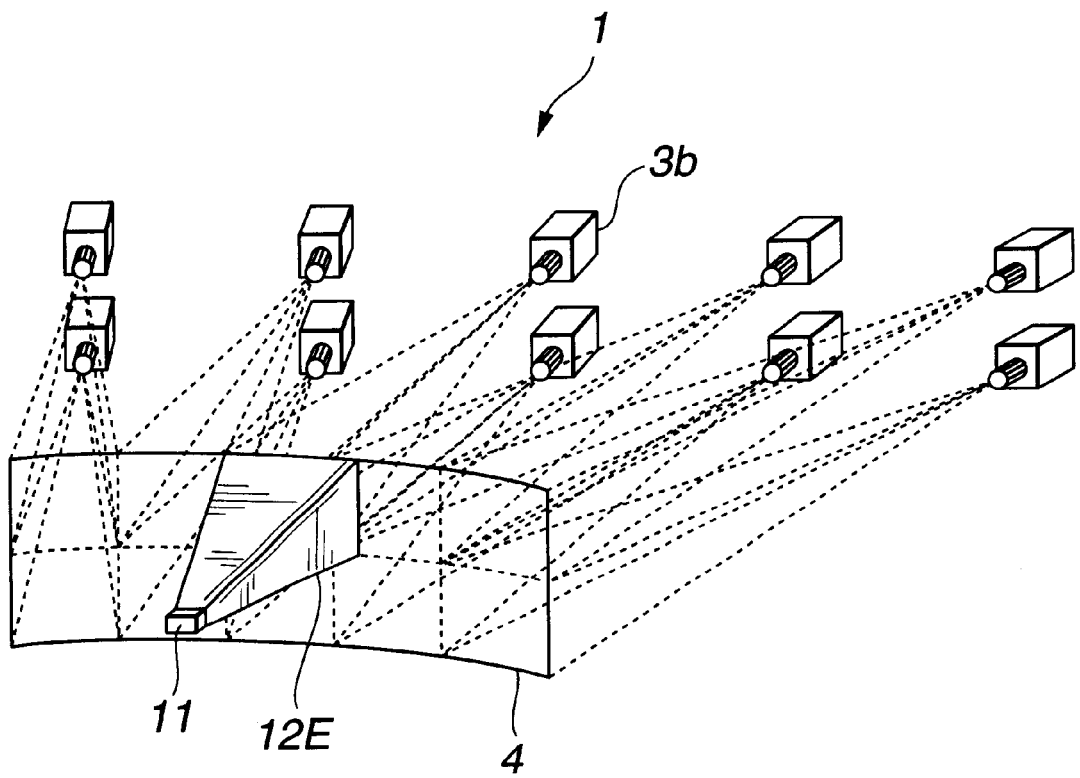
FIG. 13 is a perspective view used to explain an eighth aspect of the image calibration device of this invention.
Figure 13A:
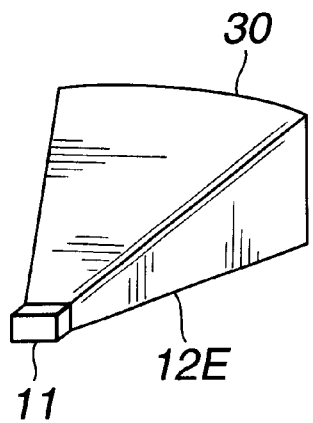
FIG. 13A is a perspective view of the shielding member of the eighth aspect.
Figure 13B:
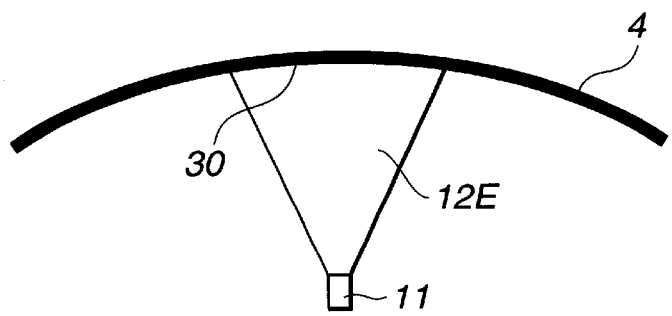
FIG. 13B is an explanatory diagram which explains the configuration of the shielding member in FIG. 13.
Figure 13C:
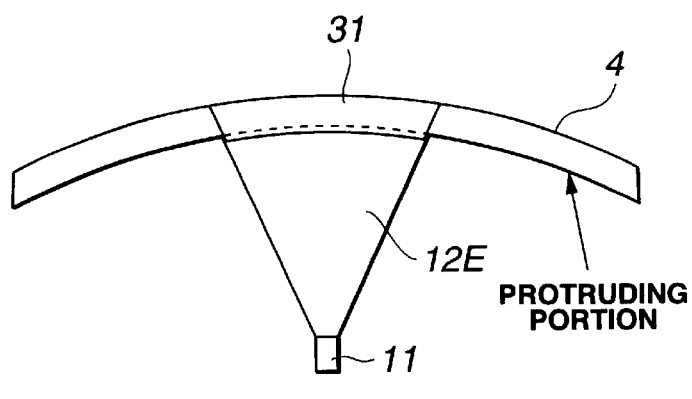
FIGS. 13C and 13D are explanatory diagrams which explain other configuration examples of the shielding member in FIG. 13.
Figure 13E:
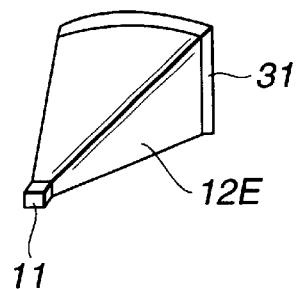
FIG. 13E is a perspective view of the shielding member in FIGS. 13C and 13D.
Figure 13D:
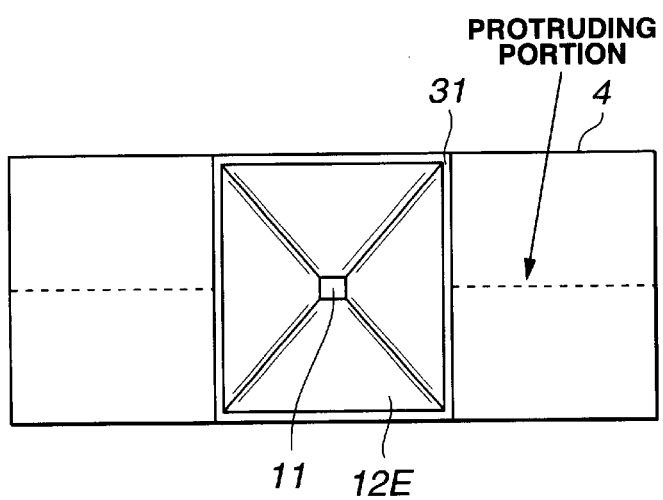
Figure 13F:
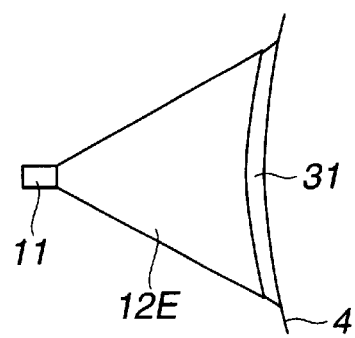
FIG. 13F is an explanatory diagram which explains the configuration of the shielding member in FIGS. 13C and 13D.

FIGS. 13 through 13F show an eighth aspect of the image calibration system device of this invention. FIG. 13 is a perspective view showing the overall configuration of the device when the image calibration device of this invention is applied to a rear-projection type multi-display device. FIG. 13A is a perspective view of the shielding member of the eighth aspect. FIG. 13B is an explanatory diagram which explains the configuration of the shielding member in FIG. 13. FIGS. 13C through 13F are explanatory diagrams which explain the configuration of the shielding member in cases when the shielding member 12E is made adaptable to complex screen curves. Similarly to the device shown in FIG. 10, in FIGS. 13 and 13A means, not shown, are provided for positioning and fixing in place the shielding member 12E; to simplify the explanation this explanation is omitted, and only different parts are explained.

In this aspect, the shielding member is configured to enable application to a rear-projection type multi-display device 1. In particular, when the screen 4 is a transmissive-type arc-screen, the base part 30 of the tetragonal pyramid of the shielding member 12E is formed into a shape, in the horizontal direction of the screen 4, with radius of curvature equal to the arced curved surface, as shown in FIGS. 13A and 13B, so as to enable complete shielding. Otherwise the configuration is similar to the image calibration system device 10 of the above fifth aspect. The image pick-up device 11 and shielding member 12E form a single unit, but are installed for free attachment and removal.

By this means, external light can be completely shielded by the above shielding member 12E even for a rear-projection type multi-display device having a transmissive arc-shaped screen, of the kind anticipated to come into widespread use in future, and so advantageous results similar to those of the above fifth aspect can be obtained.

In a rear-projection type multi-display device, the screen may have protrusions or depressions in vertical directions, as for example in the case of a complex arc-shaped curved surface like those shown in FIGS. 13C and 13D, with gentle protruding parts in the center or in part of the screen 4. In such cases, as shown in FIGS. 13E and 13F, if around the base of the tetragonal pyramid of the shielding member 12E are installed spacers 31 of a flexible material in close contact with the screen 4 which does not damage the screen surface, for example rubber or cloth, or of material with elasticity such as the bristles of a brush, then external light can be completely shielded in the gap with the screen 4.

Hence in this aspect, by using a shielding member 12E with improved base, advantageous results similar to those of the above fifth aspect can be obtained, even in the case of a rear-projection type multi-display device 1 having any kind of curved-surface screen.

Next, a ninth aspect of the invention is explained.

Figure 14:
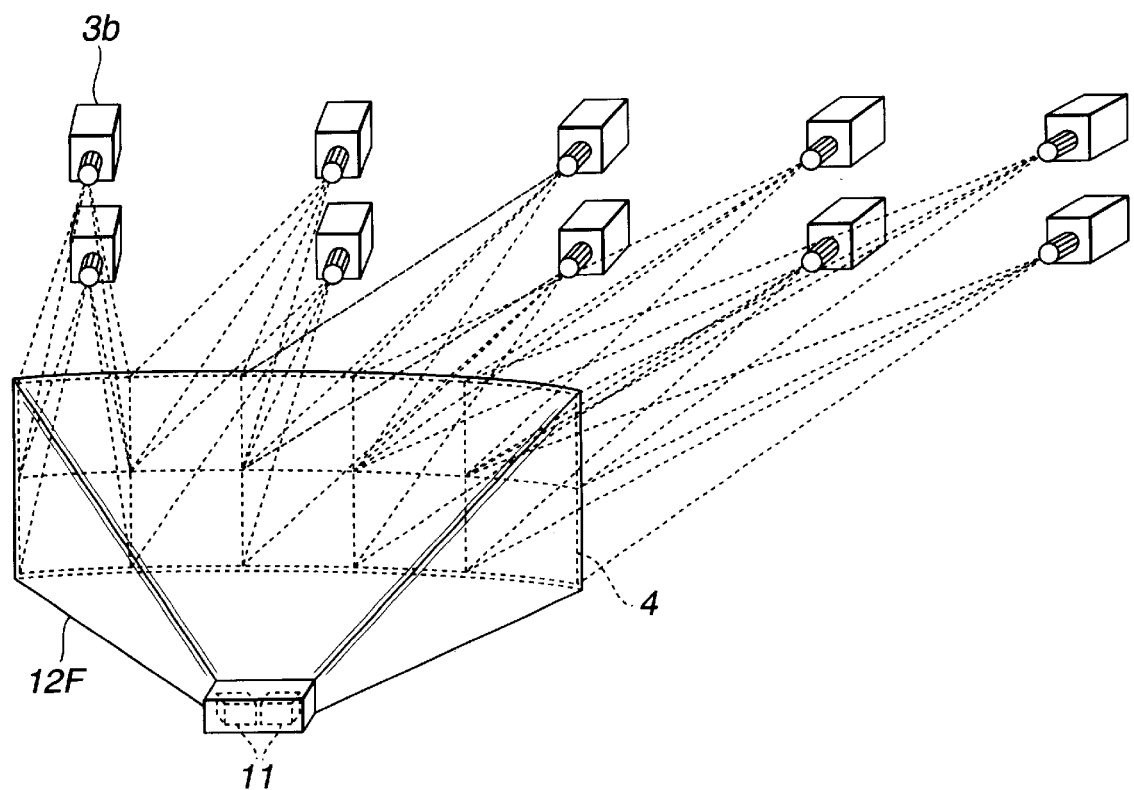
FIG. 14 is a perspective view used to explain a ninth aspect of the image calibration device of this invention.
Figure 14A:
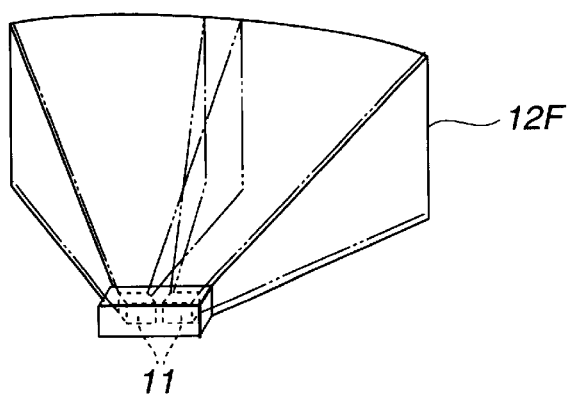
FIG. 14A is a perspective view of the shielding member of the ninth aspect.

FIGS. 14 and 14A show a ninth aspect of the image calibration device of this invention. FIG. 14 is a perspective view showing the overall configuration of the image calibration device, for the case of application to a rear-projection type multi-display device, in which a plurality of image pick-up devices and shielding means are provided.

In this aspect, a shielding member 12F is provided to cover the range over which pictures are taken by the plurality of image pick-up devices 11, enabling the taking of pictures at once of a broad-ranging displayed picture on a rear-projection type multi-display device 1 having a transmission-type screen 4 and performance of image calibration.

That is, if for example the two image pick-up devices 11 and shielding member 12F are positioned as shown in FIG. 14, and a picture is taken at once of the picture displayed on the broad screen 4 to perform image calibration. In this case, as shown in FIG. 14A, external light can be shielded reliably by a shielding member 12F covering the range of picture-taking by the plurality of image pick-up devices 11. The part containing the image pick-up devices 11 and the shielding member 12F form a single unit, but are installed for free attachment and removal.

By this means, pictures can be taken at once by a plurality of image pick-up devices and shielding means even in the case of a rear-projection type multi-display device having a screen 4 with broad display area, so that the time for picture-taking and calibration can be greatly reduced. If the plurality of image pick-up devices are installed with high precision, the joining of a plurality of pictures of which pictures are taken can be performed simply by addition and without complex calculations, contributing to simplification of processing.

Next, a tenth aspect of the invention is explained.

When performing image calibration using the image calibration device 10 of this invention, it is desirable that at least the surface of the screen 4 and the back surface be free of soiling and in a clean state. Hence the guide rails or similar installed in the above seventh aspect are utilized to disclose an aspect in which is provided a cleaning device enabling cleaning of the surface and back surface of the screen 4.

Figure 15:
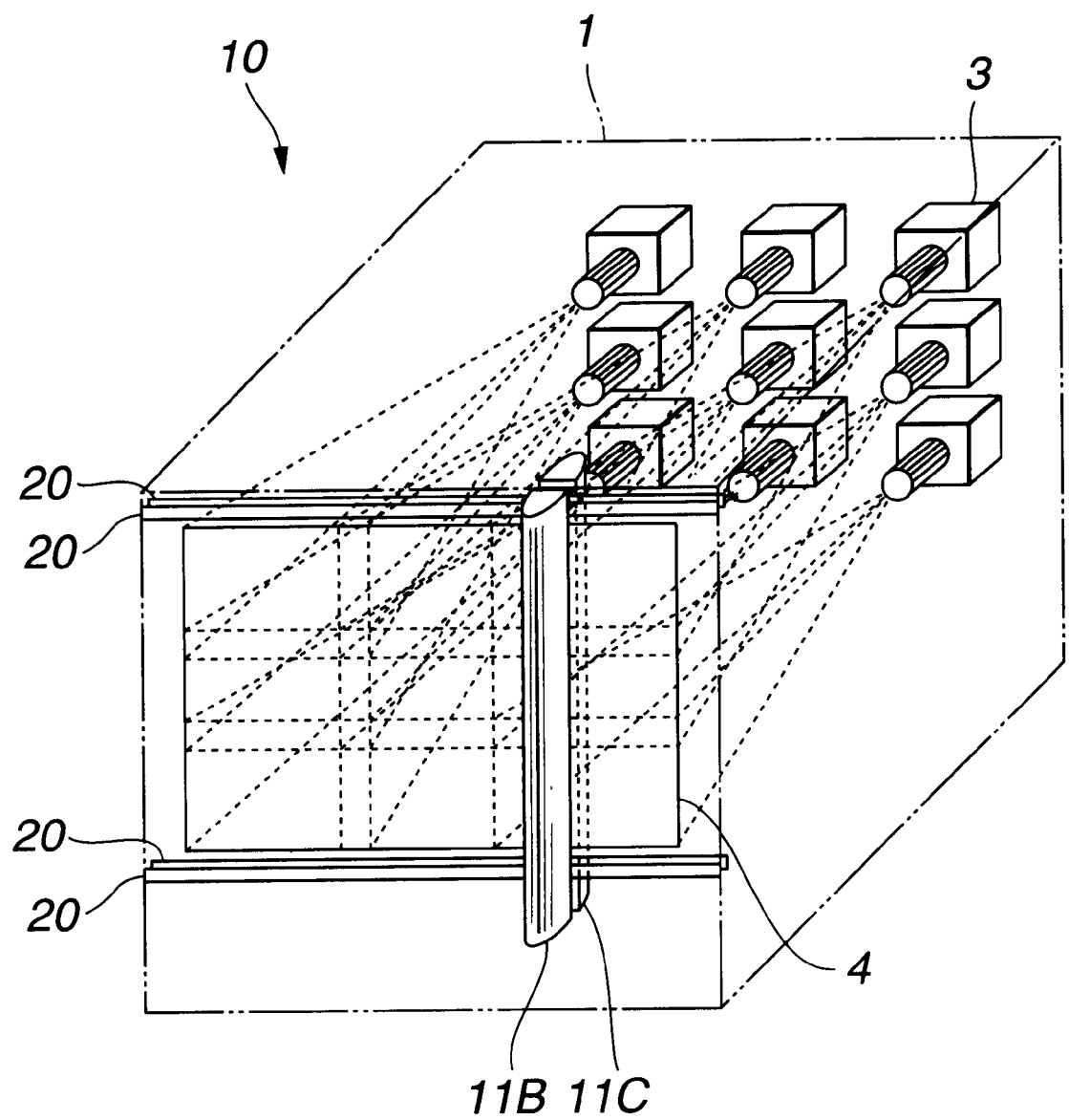
FIG. 15 is a perspective view showing the configuration of the cleaning device used in conjunction with the image calibration device of this invention, in relation to a tenth aspect.
Figure 15A:
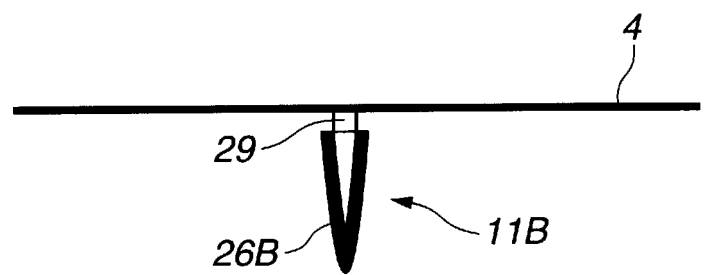
FIG. 15A is an explanatory diagram which explains the configuration of the cleaning device used in conjunction with the image calibration device of this invention, when provided on one side of the screen; and, FIG. 15B is an explanatory diagram which explains the configuration of the cleaning device used in conjunction with the image calibration device of this invention, when provided on both sides of the screen.
Figure 15B:
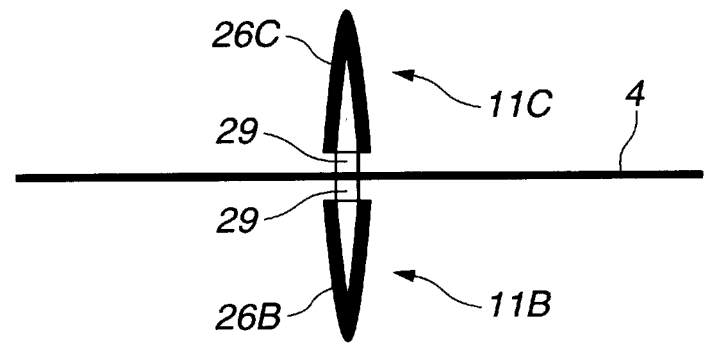

FIG. 15 is a perspective view showing the overall configuration in the case that a cleaning device is installed in the image calibration device of this invention. FIG. 15A is an explanatory diagram which explains the configuration in the case that a cleaning device, used in conjunction with the image calibration device of this invention, is provided on one side of the screen. FIG. 15B is an explanatory diagram which explains the configuration in the case that a cleaning device, used in conjunction with the image calibration device of this invention, is provided on both sides of the screen.

As in the multi-display device 1 shown in FIG. 12, guide rails 20 to guide the sliding movement of the cleaning device 11B are installed above and below the screen 4 on the front side. On the back side of the screen 4 also, in similar positions, guide rails 20 to guide the sliding movement of the cleaning device 11C are installed.

As shown in FIGS. 15A and 15B, the cleaning devices 11B, 11C are configured from, for example, U-shaped shield plates and spacers 29 comprising cleaning members to clean the screen, installed at the tip of the shield plate. These cleaning devices 11B, 11C are installed in guide rails on the front and back, positioned in opposition with the screen 4 in between, and with free horizontal movement enabled by joining the above guide rails 20 by a driving device (not shown) provided in corresponding inside positions.

Though not shown, movement of the cleaning devices 11B, 11A is controlled by a control device, not shown, similar to that of the above sixth aspect.

In this example, an explanation has been given of the provision of two cleaning devices 11B, 11C; of course, only a single cleaning device 11B may be provided, as shown in FIG. 15A.

By means of such a configuration, when executing picture-taking and image calibration using the image calibration device of this invention, by sliding the above cleaning devices 11B, 11C, the front and back surfaces of the screen 4 can be cleaned; by then using the detection device 11 of the image calibration device shown in FIG. 12 to take pictures and perform image calibration, still higher calibration accuracy can be achieved.

In each of these aspects of this invention, the projection means is not limited to a projector; the screen may be a CRT screen, and this invention also includes combinations and applications of each of these aspects.

By means of the invention described above, a device of simple construction can be used to shield ambient external light and enable accurate image calibration processing, as a result of which satisfactory high-definition projected pictures can be obtained. The image calibration device and image calibration method of this invention can also be applied to a variety of multi-displays.

What is claimed is:

1. An image calibration device, which calibrates images by using a plurality of image projection devices (projectors) to project a plurality of images at different positions on a screen, and using an image pick-up device to take pictures of the images thereby formed on said screen, comprising:

a shielding member which shields external light, and which is provided so as to extend from said screen toward said image pick-up device and to be located outside the area enclosed by lines connecting all or part of said screen and said image pick-up device;

said image pick-up device, which takes pictures of images on said screen projected by at least one of said plurality of image projection devices; and, a calibration device which calibrates the projection conditions of said image projection devices, based on the picture data obtained from the results of the picture-taking.

2. The image calibration device according to claim 1, wherein a shielding member housing receptacle which houses said shielding member is provided in proximity to said screen.

3. The image calibration device according to claim 1, wherein latches which latch said shielding member are provided on the periphery of said screen.

4. The image calibration device according to claim 3, wherein said latches latch said shielding member, and wherein said latches can be positioned.

5. The image calibration device according to claim 1, wherein the inner surface of said shielding member is configured of a material having an optical reflectivity equal to or less than a prescribed value.

6. The image calibration device according to claim 2, wherein said shielding member is formed in sheet shape, and when said shielding member is not in use, the shielding member is stored in roll form in a housing receptacle housing said image projection devices, and when said shielding member is in use, said shielding member is pulled out from said storage receptacle and used.

7. The image calibration device according to claim 3, wherein said shielding member is formed in a bellows shape, freely extensible and collapsible, or in plate shape, when said shielding member is not in use, said shielding member is folded into and stored in a front part or an inner part of the display device housing said image calibration device, and when said shielding member is in use, said shielding member is expanded and used.

8. The image calibration device according to claim 1, wherein said image pick-up device and said shielding member are installed in a freely attachable and removable single unit.

9. The image calibration device according to claim 1, having a movement device which enables said image pick-up device and said shielding member to move approximately parallel to said screen surface.

10. The image calibration device according to claim 9, wherein said movement device and said image projection device are controlled by a control device contained within said calibration device.

11. The image calibration device according to claim 1, wherein a shape of said shielding member on the screen side is formed according to the radius of curvature of the screen.

12. The image calibration device according to claim 1, wherein said shielding member on the screen side comprises a member which is deformable according to the screen shape.

13. The image calibration device according to claim 1, wherein said image pick-up device comprises a plurality of image pick-up units, and this plurality of image pick-up units is shielded by a single shielding member.

14. An image calibration method for calibrating images by using a plurality of image projection devices (projectors) to project a plurality of images at different positions on a screen, and using an image pick-up device to take pictures of the images thereby formed on said screen, comprising the steps of:

providing a shielding member which shields external light, so as to extend from said screen toward said image pick-up device which is disposed outside the area enclosed by lines connecting all or part of said screen and said image pick-up device;

projecting a plurality of images onto different positions of said screen by said plurality of image projection devices;

taking pictures of images on said screen projected by at least one of said plurality of image projection devices, by using said image pick-up device;

calibrating the projection conditions of said plurality of image projection devices based on the picture data obtained from these results; and after taking pictures using said image pick-up device, removing said shielding member from the image area on said screen on which images are displayed and from the space situated in the normal direction of the image area.

* * * * *